(12) United States Patent
Wunsch

(10) Patent No.: US 6,793,084 B1
(45) Date of Patent: Sep. 21, 2004

(54) COLLECTING, TRANSPORTING AND STORING CONTAINER

(76) Inventor: Claus Wunsch, Berliner Ring 89, 64625 Bensheim (DE)

( * ) Notice: Subject to any disclaimer, the term of this patent is extended or adjusted under 35 U.S.C. 154(b) by 0 days.

(21) Appl. No.: 10/048,674
(22) PCT Filed: Jul. 13, 2000
(86) PCT No.: PCT/EP00/06703
§ 371 (c)(1),
(2), (4) Date: Feb. 1, 2002
(87) PCT Pub. No.: WO01/09010
PCT Pub. Date: Feb. 8, 2001

(30) Foreign Application Priority Data

Aug. 3, 1999 (DE) .......................................... 299 13 537
Jan. 31, 2000 (DE) .......................................... 100 04 116

(51) Int. Cl.⁷ .......................... B65D 43/16; B65D 45/28; B65D 88/00
(52) U.S. Cl. .......................... 220/1.5; 220/263; 220/323
(58) Field of Search .......................... 220/1.5, 323, 263, 220/314, 810, 223, 234, 235, 236, 237, 238, 244, 251

(56) References Cited

U.S. PATENT DOCUMENTS

| | | | |
|---|---|---|---|
| 2,470,776 A | * | 5/1949 | Jewell .................... 220/592.28 |
| 2,955,452 A | * | 10/1960 | Myers .......................... 68/242 |
| 4,467,936 A | * | 8/1984 | Makhijani .................... 220/246 |
| 4,891,910 A | | 1/1990 | Cook et al. |

FOREIGN PATENT DOCUMENTS

| | | |
|---|---|---|
| DE | 33 12 786 | 10/1984 |
| DE | 35 16 721 | 11/1986 |
| DE | 36 40 467 | 6/1988 |
| DE | 36 40 440 | 9/1988 |
| DE | 38 23 285 | 1/1989 |
| DE | 41 10 847 | 11/1991 |
| DE | 40 05 984 | 10/1992 |
| DE | 42 26 638 | 2/1994 |
| DE | 43 21 199 | 3/1994 |
| DE | 43 20 054 | 4/1994 |

* cited by examiner

Primary Examiner—Nathan J. Newhouse
Assistant Examiner—Niki M. Eloshway
(74) Attorney, Agent, or Firm—Norris McLaughlin & Marcus P.A.

(57) ABSTRACT

Collection, transportation and storage container (10) for liquid and/or solid substances, having a container body (12) which is of double-walled form in the base and circumferential regions as a result of an inner container inserted into the outer container and continuously cylindrical from the base to the filling aperture, and has at its top a filling aperture which is of circular outline in plan view and can be hermetically sealed by a pivotable lid (14) with an annular seal.

The inner container has a continuous cylindrical shape from the base to the filling aperture, and the lid (14) is circularly defined, at least in a part-region on the container side in the closed state, so that it can be pivoted to fit into the inner container.

The annular seal is disposed in the part-region of the lid (14) which, in the closed position of the lid, lies within the filling aperture, and the lid is provided with locking means which are optionally actuable from a position retracted from locking seatings provided on the container body (12) into a position engaging with positive fitting into the locking seatings.

24 Claims, 23 Drawing Sheets

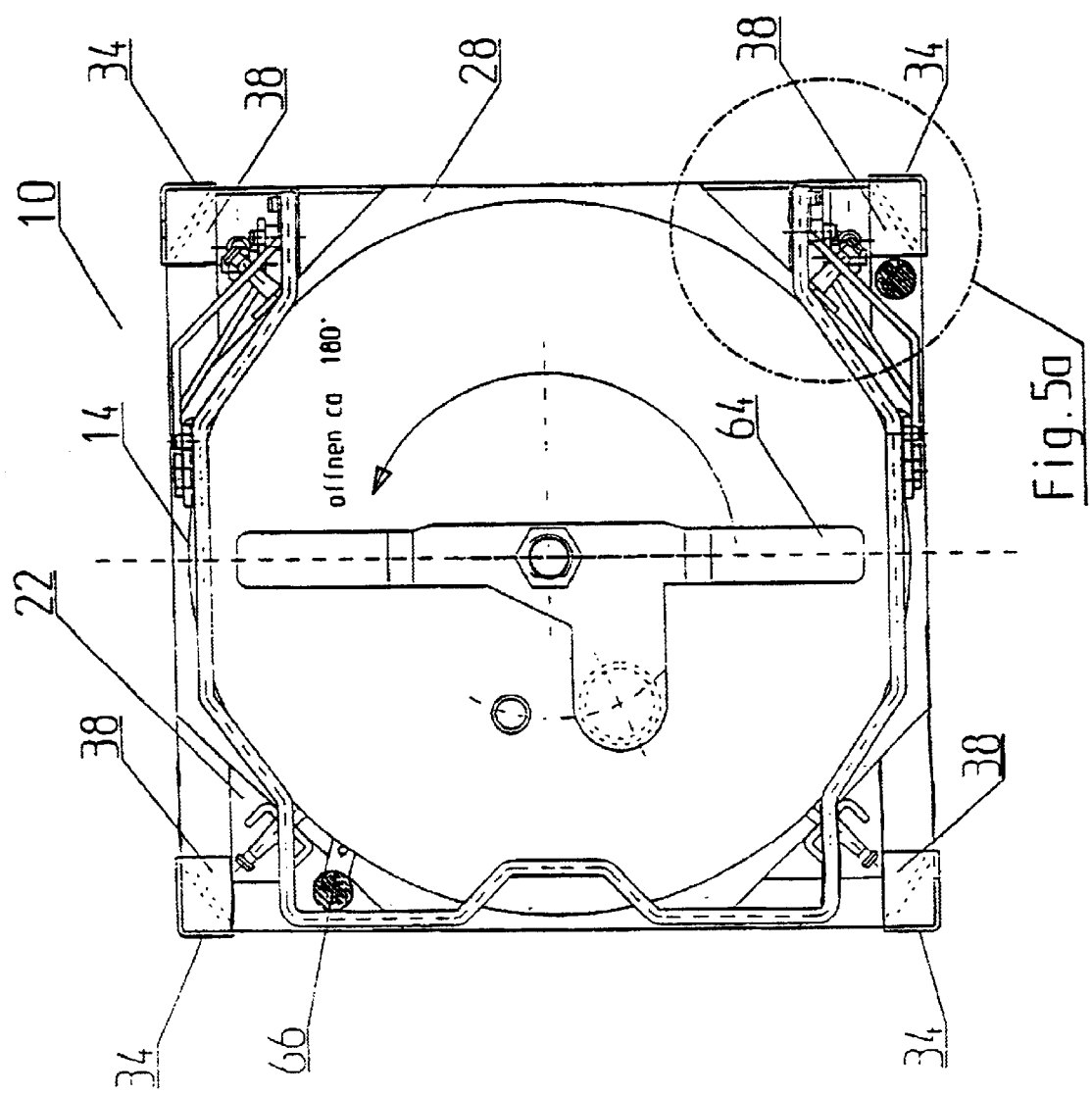

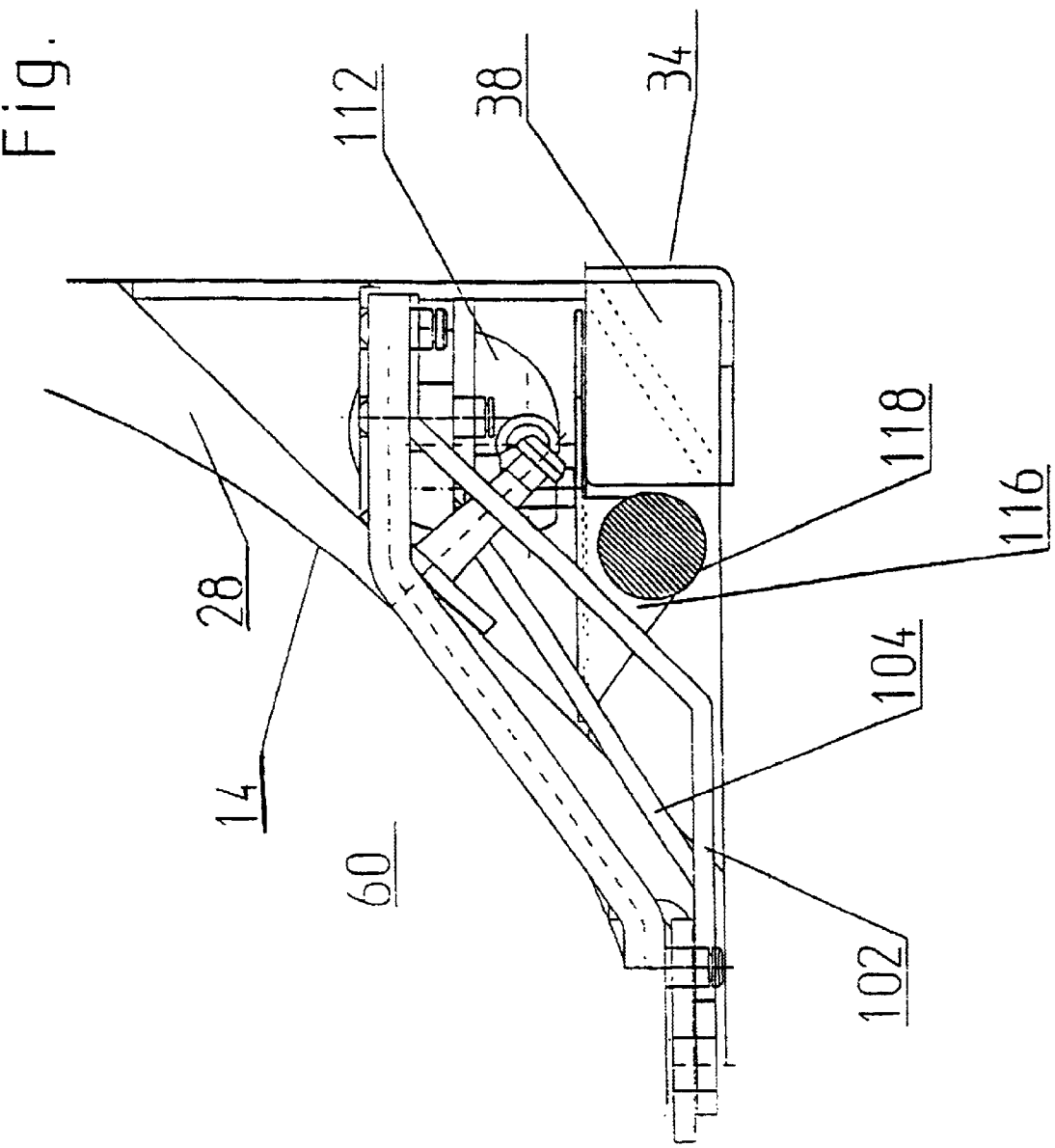

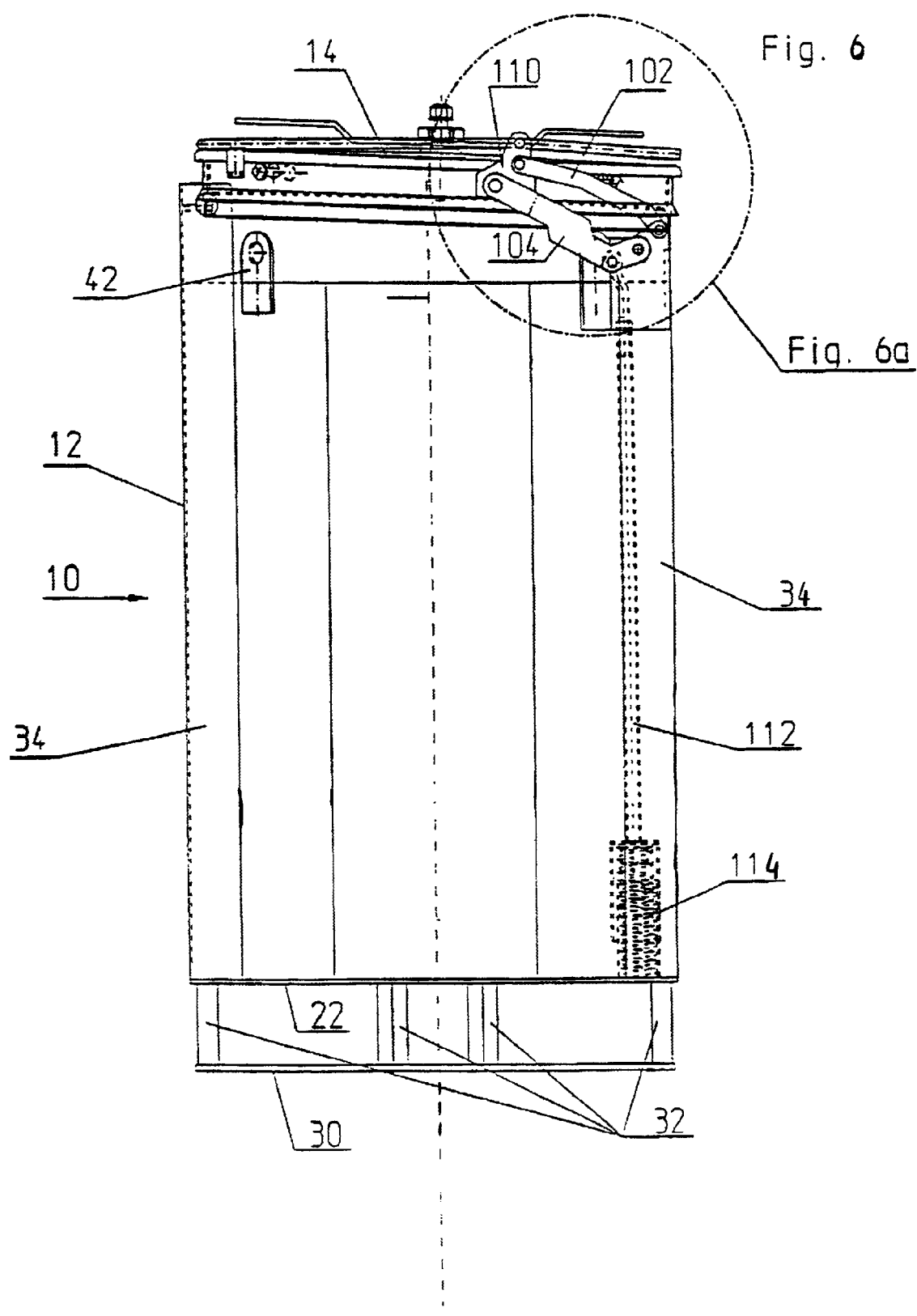

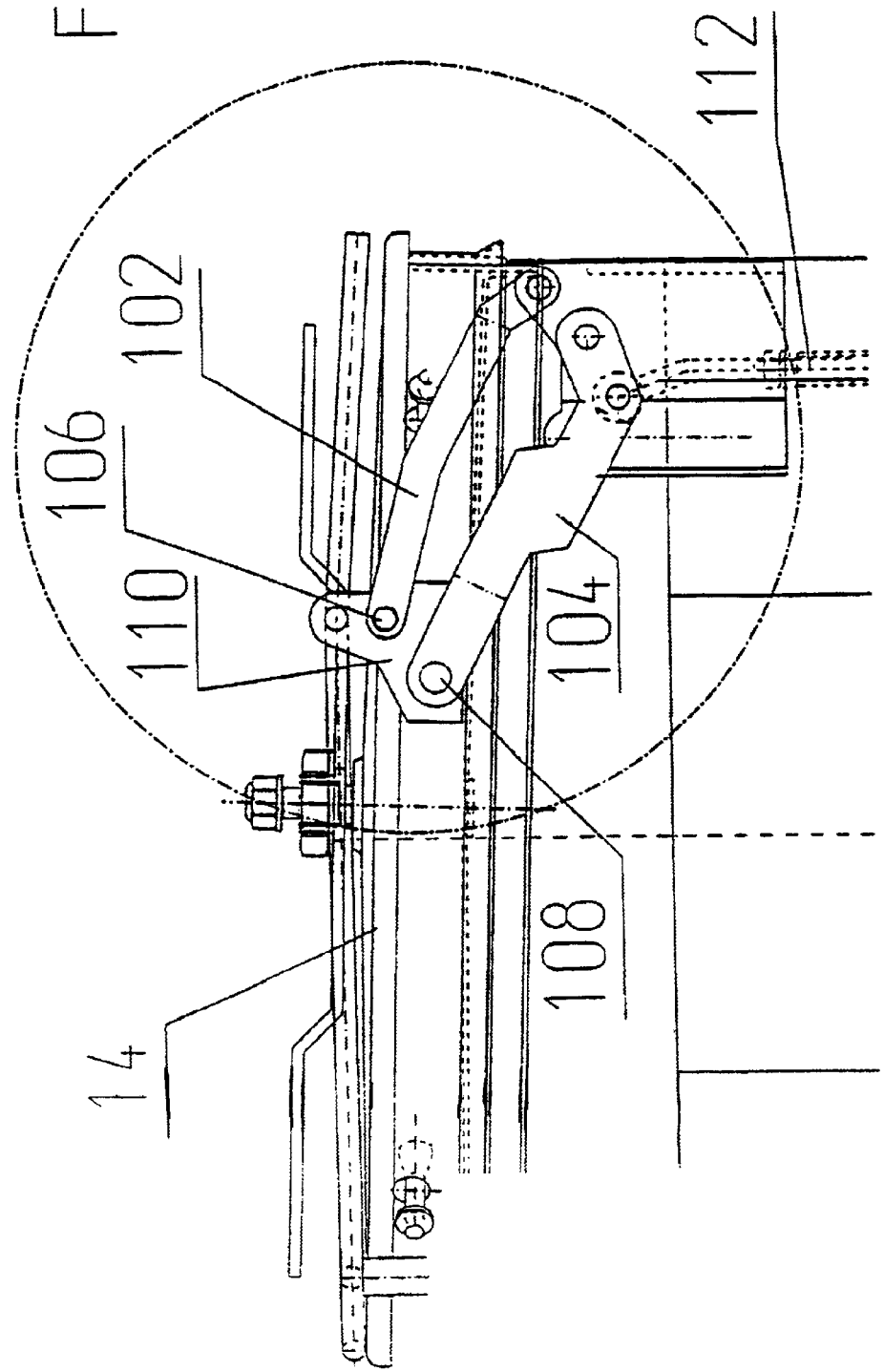

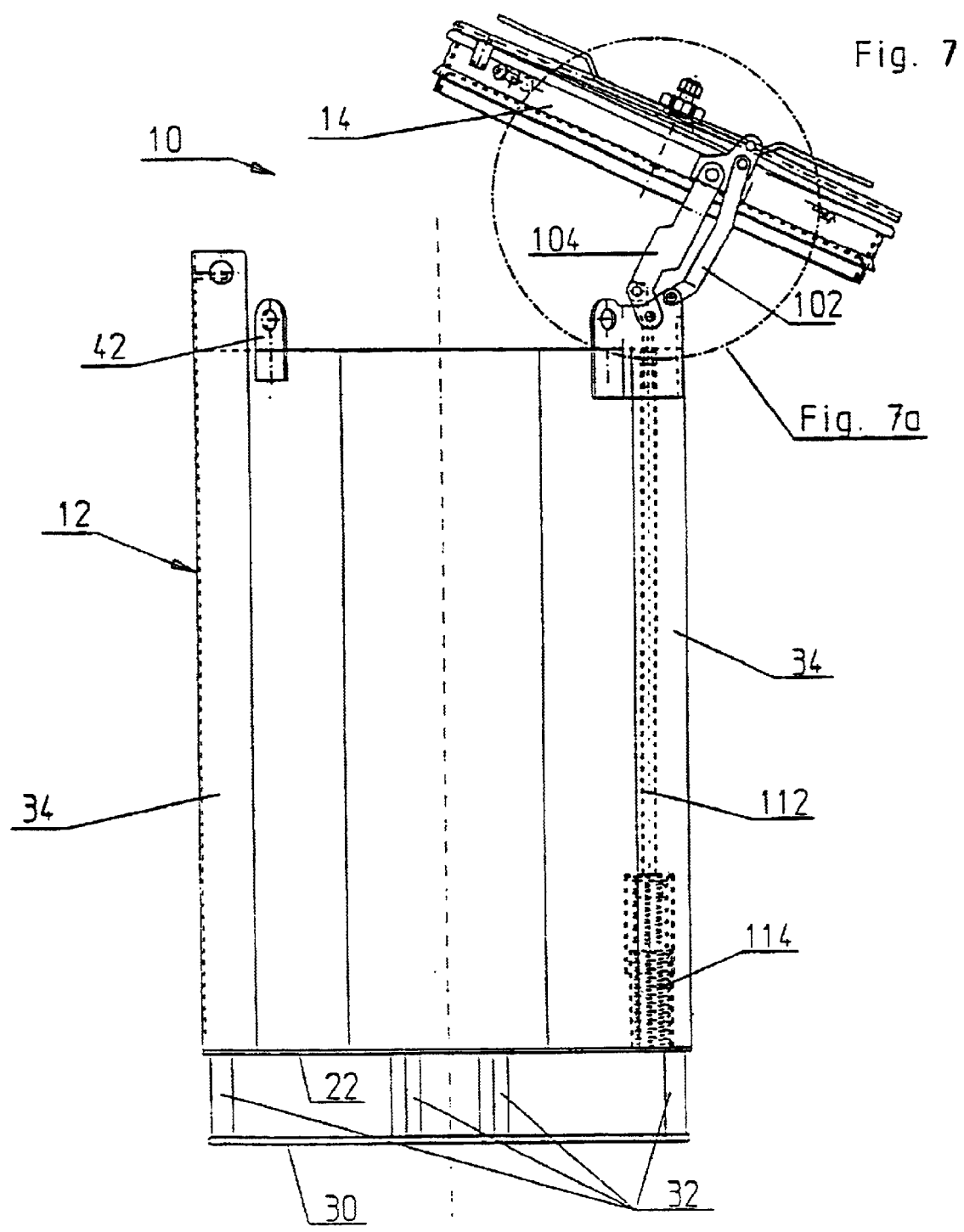

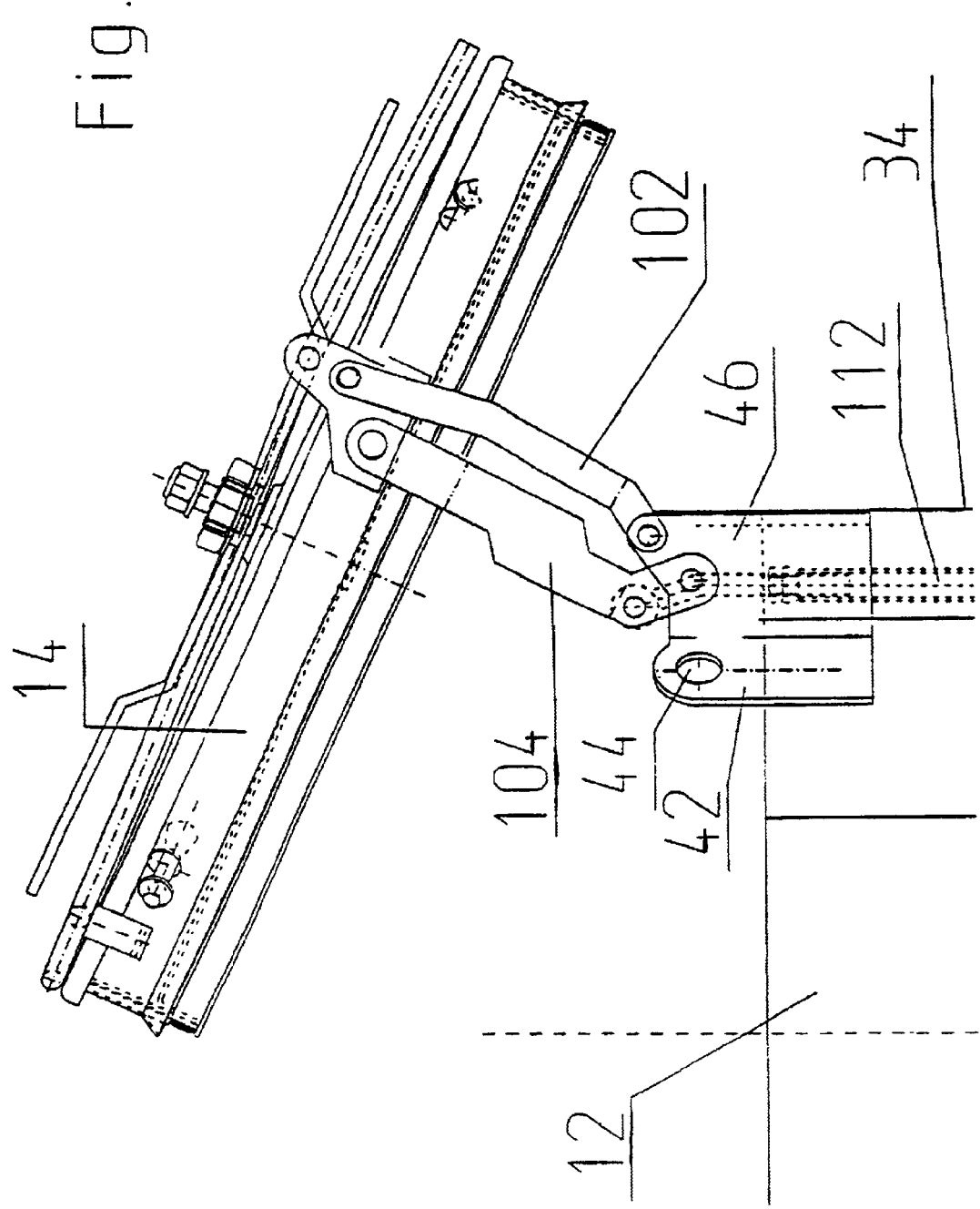

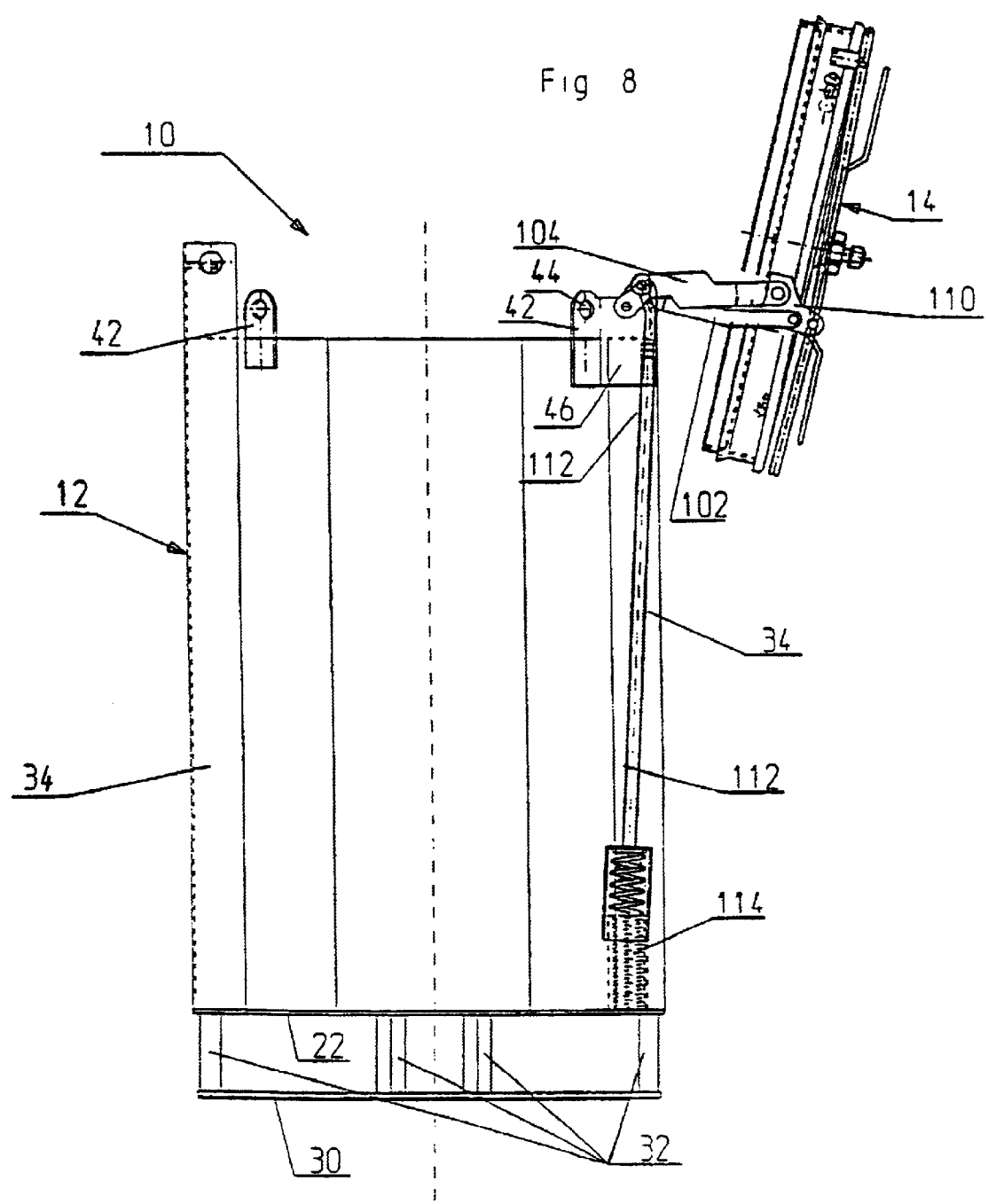

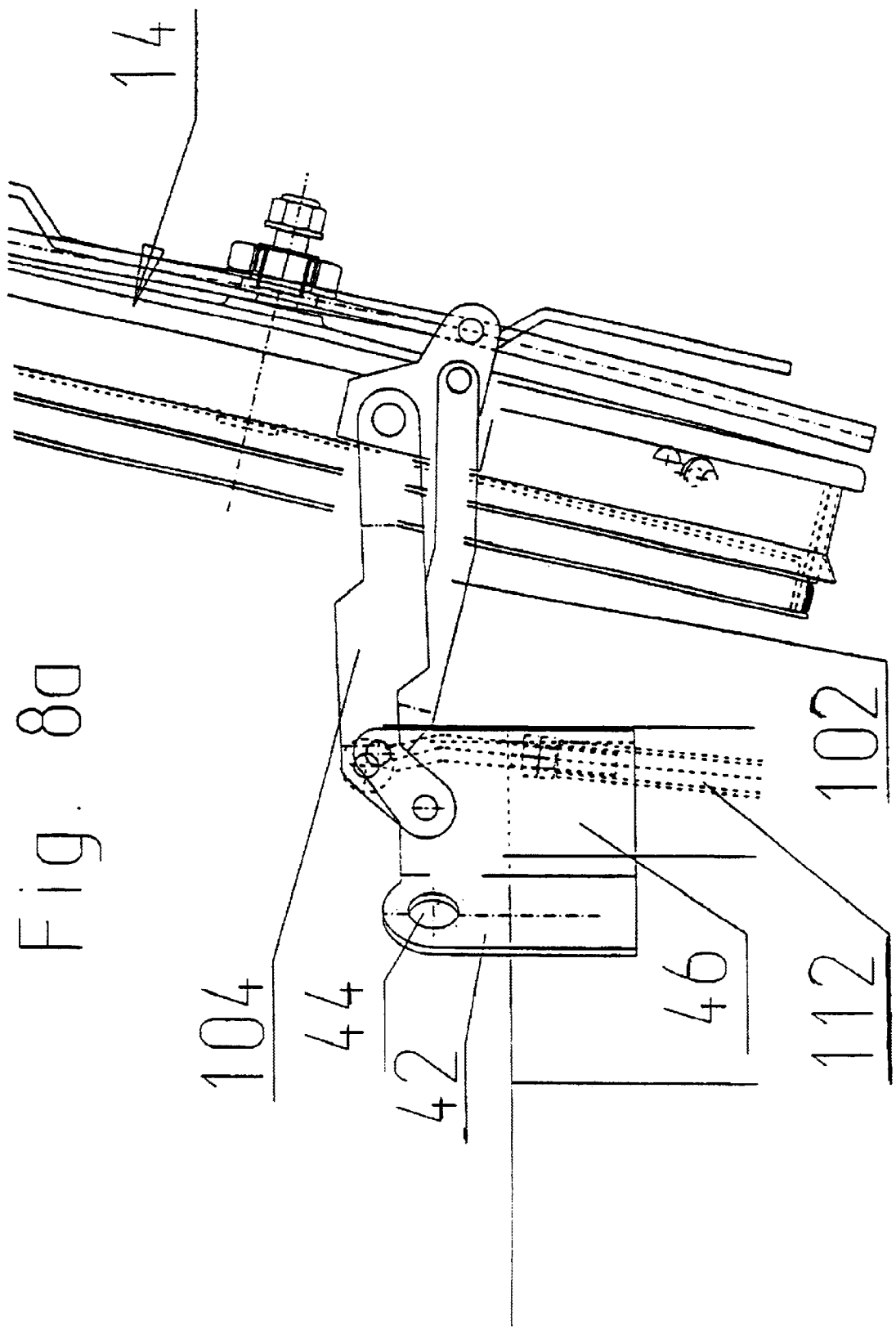

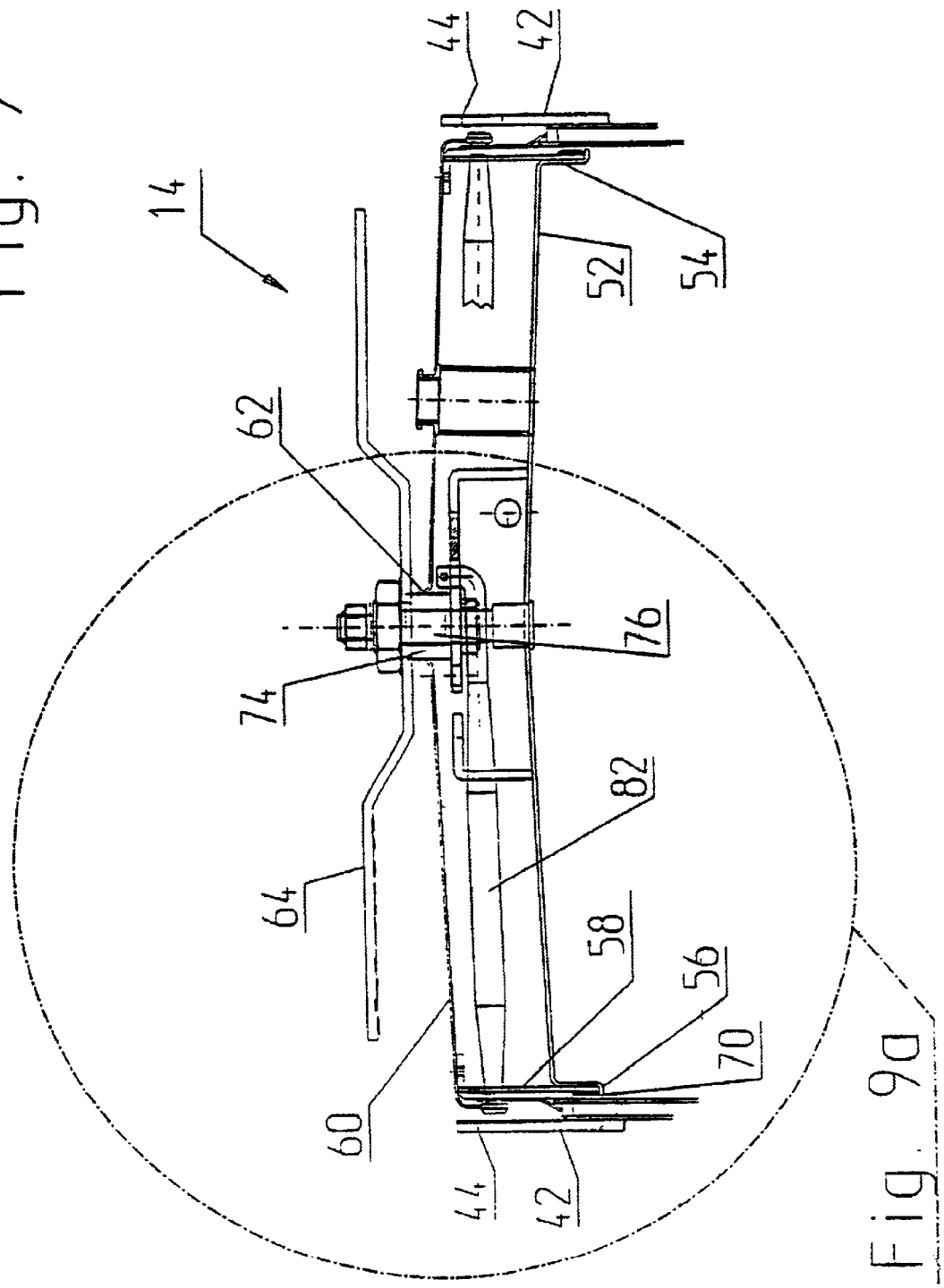

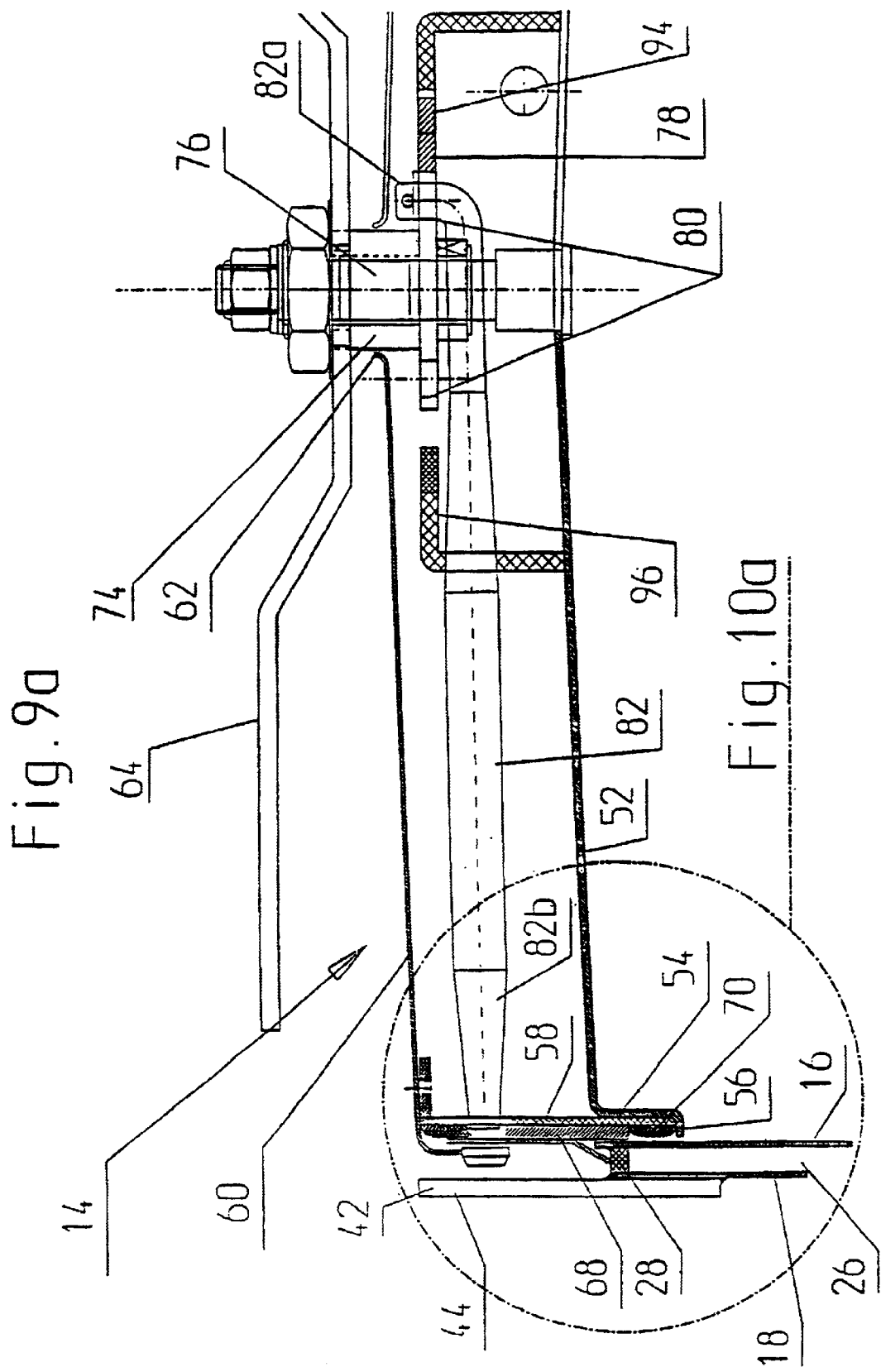

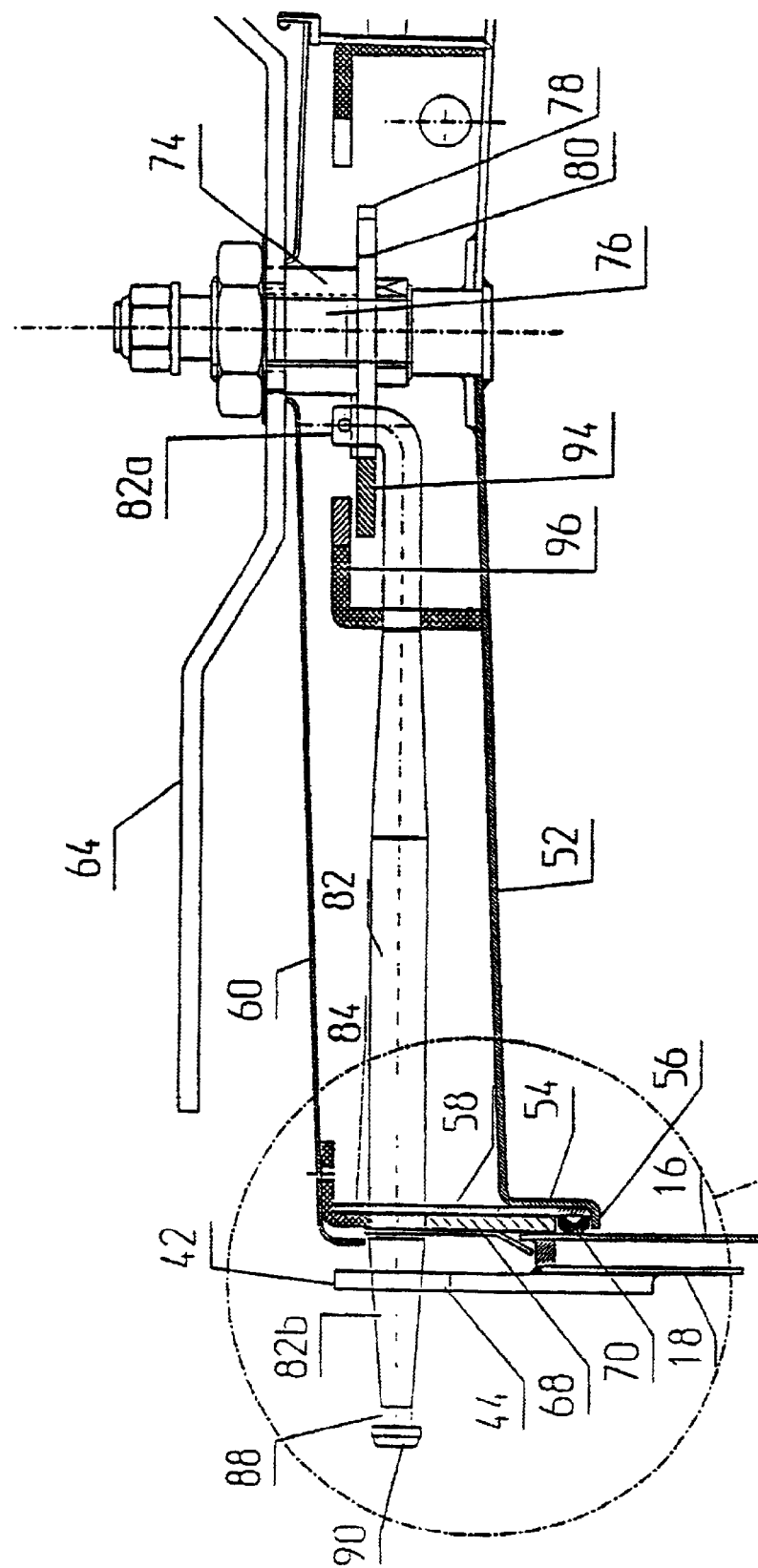

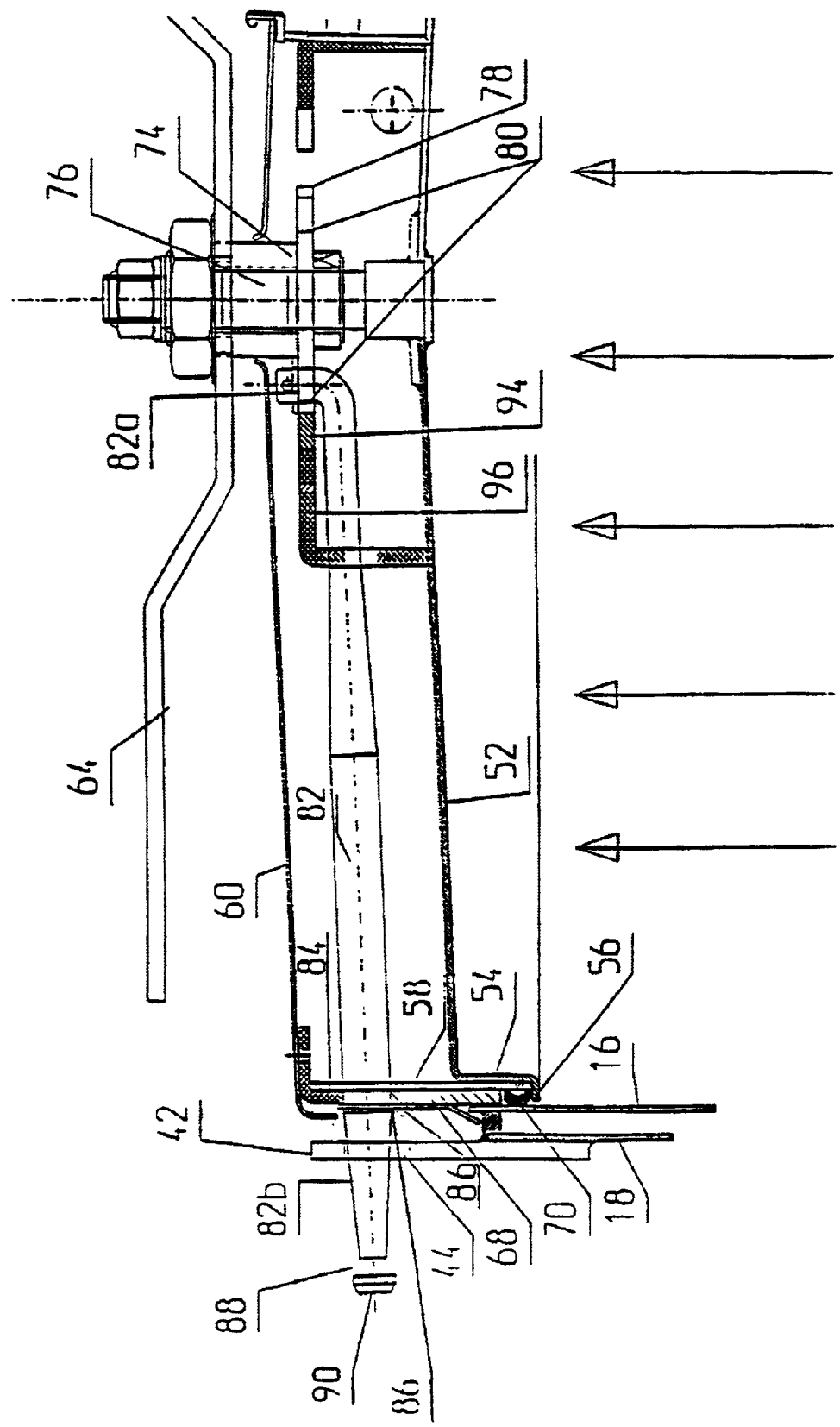

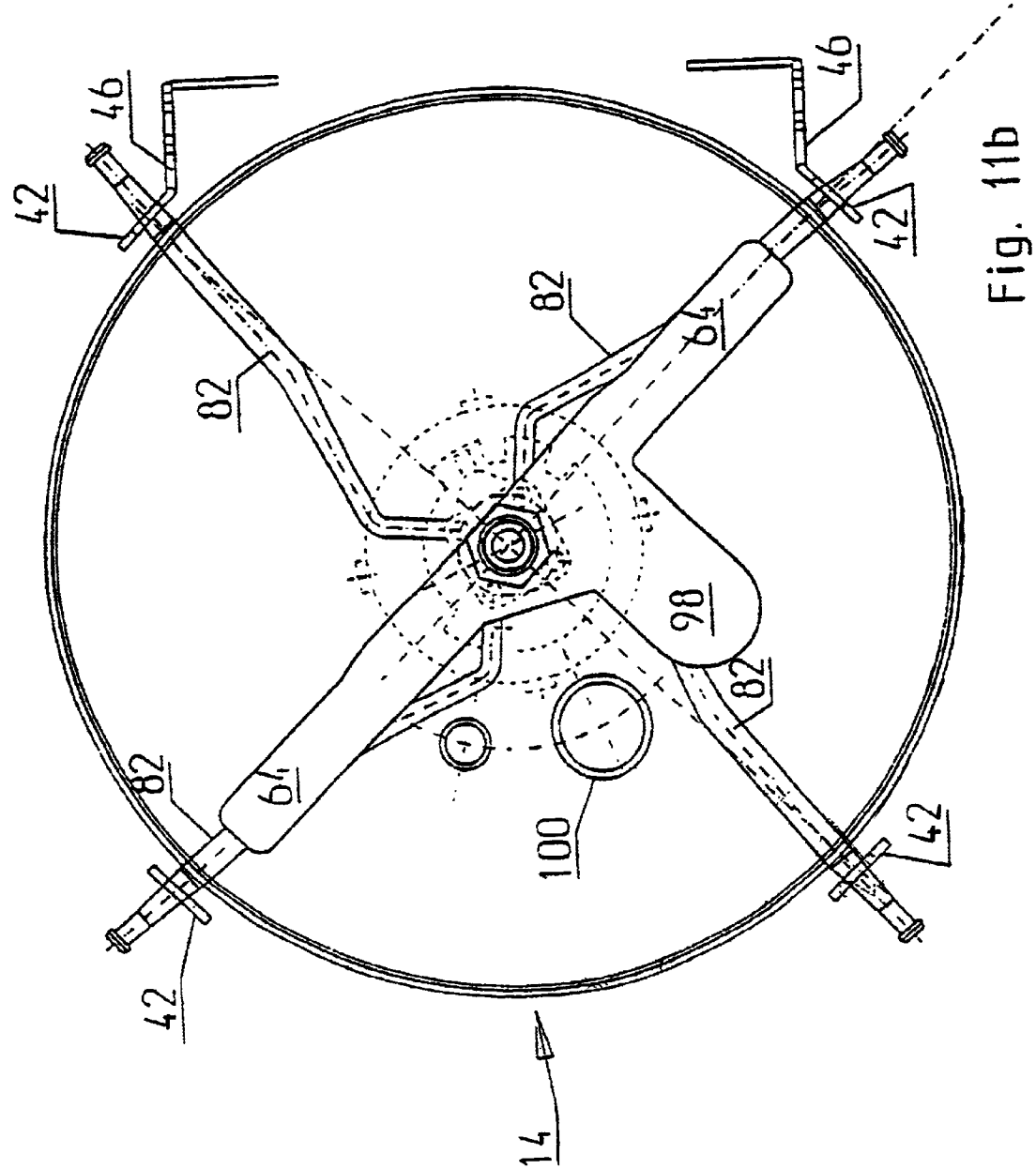

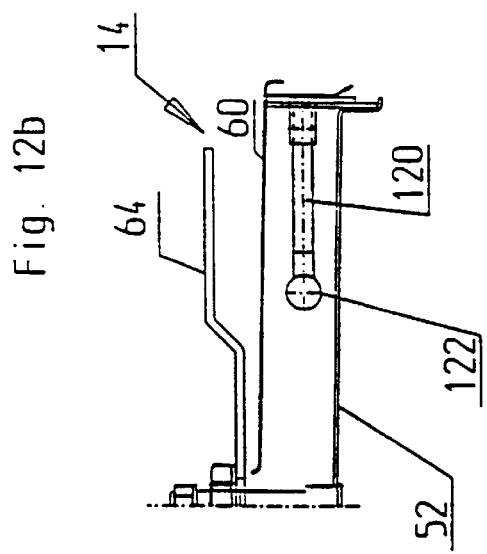
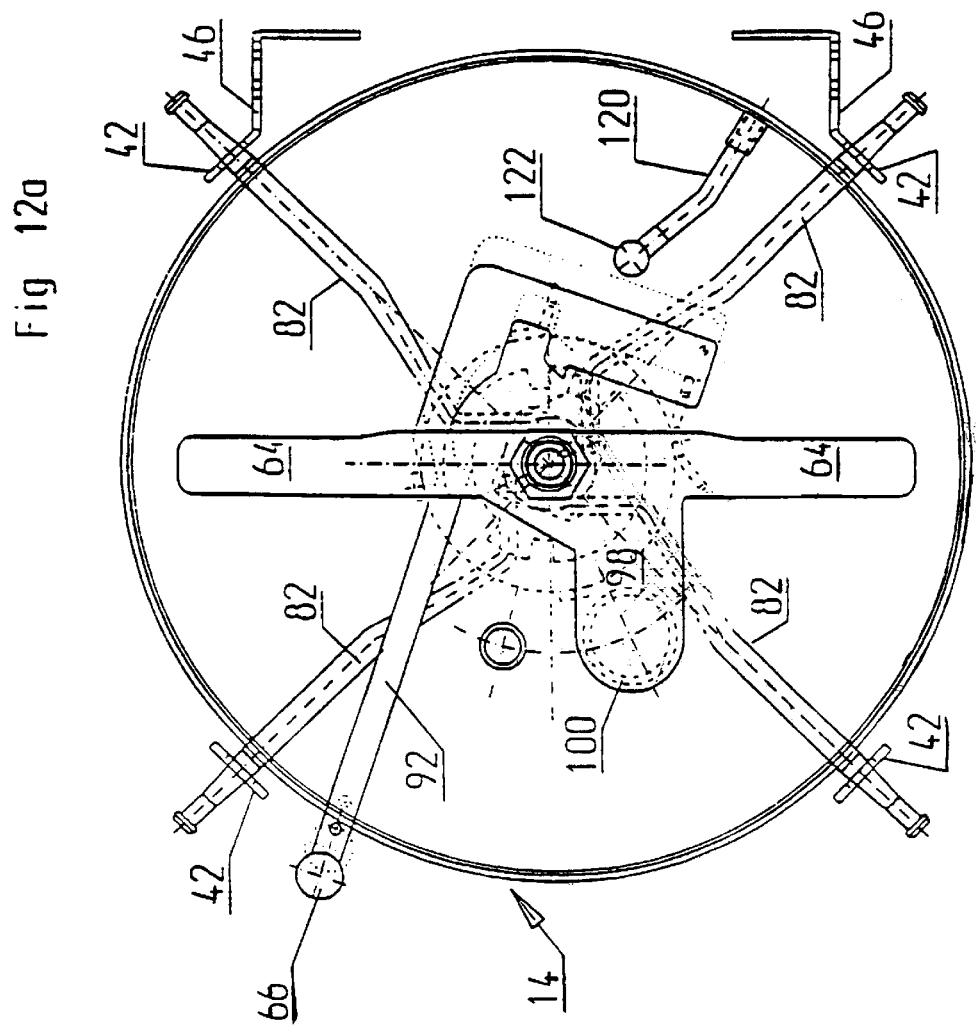

COLLECTING, TRANSPORTING AND STORING CONTAINER

The invention relates to a container for liquid and/or solid substances, having a container body which is of double-walled form in the base and circumferential regions as a result of an inner container inserted into an outer container and continuously cylindrical from the base to the filling aperture, and has at its top a filling aperture which is of circular outline in plan view and can be hermetically sealed by a pivotable lid with an annular seal, which lid, at least in a part-region on the container side in the closed state, is of circular form such that it can be pivoted to fit into the inner container and is provided with locking means which are optionally actuable from a position retracted from locking seatings provided on the container body into a position engaging with positive fitting into the locking seatings, the annular seal being disposed in the part-region of the lid lying within the filling aperture in the closed position of the lid and being formed as a continuous sealing ring of elastomeric material, whose external diameter in the underformed state is substantially equal to or only slightly smaller than the clear internal diameter of the inner container and whose internal diameter is substantially equal to or only slightly larger than the external diameter of the lid in the region retaining the sealing ring in its intended assembly position on the lid.

Containers which can be used, for example, for the transportation of wastes or of environmentally hazardous substances such as chemicals, oils and similar liquids, and which therefore have to be sealingly closeable and resistant to the action of external forces, are known (e.g. DE 41 10 847 C2, DE 43 21 199 C2), the actual container body in such cases still being retained in a framework formed by sections enclosing it, which framework has fork guides in the base region for receiving a fork of a fork lift and respective stacking corners in the upper region which permit a plurality of containers to be stacked one upon the other. The known containers have proved highly suitable for specific uses. Because of the fact that they have a filling aperture of significantly reduced diameter by comparison with the internal diameter of the container body, however, their emptying—for example, when filled with a flowing content or pieces of solid content—is critical, especially if the contents tend to adhere or harden. Cleaning of the emptied container through the narrowed aperture is also laborious and also difficult to verify, especially in the region of the container lid surface in the regions adjoining the filling aperture.

U.S. Pat. No. -A-5 083 509 has disclosed a container which comprises a continuous cylindrical inner container without a tapered mouth, but which is intended not as a transportation and storage container but exclusively as a refuse container for solids, and comprises compacting means by means of which the refuse introduced can be compressed into packet form. For this purpose, the container is provided with a compression piston displaceably disposed in the inner container and performing a compression stroke towards the sealed container mouth through evacuation of the space containing the refuse to be compressed. After opening of the container seal, the compressed refuse packet can then be removed from the container. The auxiliary units necessary to evacuate the container, such as the motor-driven suction pump, valves, etc., are in this case disposed below the base of the inner container within an installation space formed by the lengthened outer container.

By contrast, it is an object of the invention to provide a container suitable as a collection, transportation and storage container for all contents in the form of all liquid, pasty and flowing contents, or solid contents in piece form, which is so designed that it is fundamentally authorizable and suitable for all hazardous categories, in other words also including hazardous goods.

Starting from a container of the type referred to initially, this object is achieved, according to the invention, in that the lid, in its end region facing the interior of the container, comprises a peripheral, radially projecting flange which is adjoined, in the direction away from the interior of the container, by a cylindrical peripheral wall on which first the sealing ring and then a continuous cylindrical tensioning ring are disposed to be displaceable in the longitudinal direction of the container, and in that the tensioning ring projects beyond the end wall of the lid on the interior of the container, in the direction away from their interior of the container, and adjustment means for the optional displacement of the tensioning ring in the direction leading towards the interior of the container or out of the interior of the container engage onto the region of the tensioning ring projecting beyond the lid end wall. As a result of the configuration of the container at the filling end, such that the container body virtually no longer has a separate filling aperture but is open at the top and the lid, which in the closed position engages to fit partially into the open container, thus ensures free access to the interior of the container in the opened position, not only the complete emptying of the container and verification thereof but also any careful cleaning thereof that may be necessary are readily possible. In particular, automatic cleaning devices can also be developed, with which, in addition to cleaning with high-pressure jets of cleaning fluid, revolving brushes can be employed whose use is not obstructed or made more difficult by a narrowed filling aperture. By actuating the adjustment means in such a way that the tensioning ring is displaced towards the interior of the container, it is brought into contact with the sealing ring and then deforms it elastically in such a way that it rests both on the inner surface of the inner container and on the cylindrical peripheral wall of the lid, with prestress. The increase in pressure occurring in the interior of the container, which may be attributable, for example, to gaseous constituents released by the contents on warming, additionally deform the sealing ring and so increase the force of its contact pressure on the inner wall of the container or the cylindrical peripheral wall of the lid.

In an advantageous further development of the invention, the outer container may have a shape which is polygonal, preferably octagonal, in plan view, and in that the cylindrical inner container is disposed in concentric orientation to the outer container and its external diameter is at least slightly smaller than the clear distance measured between the interior surfaces of the outer container. The container body is thus of double-walled configuration, the polygonal shape of the outer container being strengthened, by comparison with a cylindrical outer container, by the bending edges formed, in the manner of beading, between the respective part-surfaces of the polygon.

In an advantageous further development of the invention, the outer container comprises a substantially square base plate, whose diametrically opposite limiting edges are oriented substantially flush with the outside of the assigned opposite part-surfaces of the outer container.

In the corner regions of the base plate projecting beyond the outer surfaces of the outer container a metallic corner section extending to beyond the filling aperture in the vertical direction is in each case expediently provided, which corner sections are part of a framework enclosing the container body.

The adjustment means for displacing the tensioning ring are expediently configured from locking elements distributed in the peripheral direction on the top, remote from the container, of the lid end wall beyond the periphery thereof, and guided in a substantially radially displaceable manner and capable of being advanced into and retracted from respectively assigned apertures in the tensioning ring, which locking elements each engage into the respectively assigned aperture in the tensioning ring by a limiting surface which in each case tapers from inside to outside. The adjustment of the tensioning ring is thus effected by the tapering limiting surfaces which act in the manner of wedges.

The locking elements may then advantageously be extended radially outwards via the tapering limiting surface engaging into the respective aperture in the tensioning ring, up-ward-projecting tabs with apertures as locking seatings for the locking element extensions being provided substantially flush with the apertures in the tensioning ring of the container body. In addition to the non-positive retention of the lid in the interior of the container via the deformed annular seal in the closed position, therefore, a mechanical locking is achieved here by the lock extensions which, with a suitable configuration, remains effective even if the sealing ring is partially or completely detensioned by retraction of the locking elements. This provides security against sudden opening of the lid as a result of super atmospheric pressure that has arisen in the interior of the container.

In an advantageous further development a head, enlarged in diameter by comparison with the locking extension, is provided in each case on the free outer ends of the locking extensions, the diameter of which head is in each case smaller than the diameter of the assigned aperture, provided as a locking seating, in the upward-projecting tabs.

Expediently, the head provided at the free end of each locking element extension comprises a limiting surface tapering radially and frustoconically outwards, which guides the head, during the locking operation, into the assigned aperture provided as the locking seating.

The locking elements, for their part, may be each connected via an elongate shank section to an assigned lever arm rotatable about the central axis of the container, the lever arms for the actuation of the locking elements expediently being disposed on a common actuating element rotatable about the central axis of the container, on whose upper end, projecting from the lid, a manually actuable lever-like handle is provided. Instead of individual lever arms projecting radially in each case from the rotatable actuating element, these lever arms may also form part of a common actuating plate projecting radially over the actuating element, in the peripheral region of which the actuating rods are each articulated offset relative to one another in the peripheral direction.

Because of the specific outer shape of the container, a configuration is recommended in which a total of four locking elements, each offset relative to one another by approximately 90° in the peripheral direction, are provided on the top of the lid end wall and the tabs provided with apertures serving as locking seatings are each disposed to project in the vertical direction from the upper edge of the container body above the projecting corner regions of the base plate.

The dimensions and the position of the outward-tapering limiting surfaces provided on the locking elements and engaging into assigned apertures in the tensioning ring and the locking element extensions, and also the effective length of the lever arms rotatable about the central axis of the container, are, in an advantageous further development of the invention, so matched to one another that, in the event of a rotational actuation of the handle out of the closed position of the lid over a first partial actuation path, the tensioning ring is released in the vertical direction to such an extent that the sealing ring, which in the closed position of the lid is deformed by the tensioning ring into sealing contact on the inner container, is deformed back elastically into its initial shape, the locking element extensions still engaging through the apertures, serving as locking seatings, in the tabs and are only retracted out of the apertures in the tabs on further rotational actuation over the residual actuation path. It is thereby ensured that the sealing ring is already completely detensioned and consequently a reduction in pressure in the interior of the container is possible, while the lid is still mechanically secured against opening by the locking element extension.

With a configuration of this type, it is advantageous if a stop device which is active between the lever-like handle and the lid and can be manually inactivated is provided, and, on actuation of the lever-like handle out of the closed position, becomes active after one rotation over the first partial actuation path. This excludes the possibility that the lever-like handle may be opened so quickly, in one movement, that the detensioning of the sealing ring and the mechanical unlocking of the lid by means of the locking element extension take place virtually simultaneously and the lid may thus spring open as a result of the internal pressure that has arisen within the container and endanger the operator. In this case, the stop device advantageously comprising a stop assigned to the lever-like handle and projecting towards the top of the lid, on the one hand, and a counter-stop projecting upwards from the lid and disposed in the actuation path of the stop on the other hand, the stop assigned to the lever-like handle being configured to be manually moveable out of its stop position in which it comes to rest against the counter-stop.

In this case, expediently, the stop is resiliently pretensioned in the stop position against the counter-stop and can be adjusted out of the stop position by an unlocking element assigned to the lever-like handle, without encompassing, against the spring prestress.

The lid is preferably pivotably articulated on the upper edge of the container body and, in a further development according to the invention, can be pivoted through more than 90°.

An expedient embodiment here is one in which the lid can be fixed, by a manually actuatable lid securing device, in an intermediate position in the range between approximately 90° and 120°.

In a preferred embodiment of the invention, the lid is articulated on the container body via a joint mechanism which guides the lid, during the start of the opening movement, initially with a movement component oriented substantially out from the inner container and only makes the transition to the pivot movement after the lid has emerged from the mouth of the inner container. Joint mechanisms with these kinematics are known, for example, from the joint hinges employed today in furniture construction. Thus, for example, a basically suitable joint mechanism here is what is known as a four-joint mechanism, the kinematics of which are expediently such that the lid, pivoted into and fixed in the intermediate position, is laterally offset relative to the container body in plan view and the interior of the container is thus accessible for the introduction of a filling or extraction member or, alternatively, the introduction of cleaning equipment from the top.

As the lid of the container according to the invention may be comparatively heavy because of its relatively large diameter, by comparison with known containers, and the complex tensioning and locking mechanism, it is advisable for a spring prestress device to engage on the joint mechanism and, at least during the first part of the opening movement of the lid out of its closed position, generates a force oriented in the opening direction which at least partially compensates for the weight of the lid acting in the closing direction.

The container according to the invention is produced, expediently to a large extent but at least in respect of its parts coming into contact with the container contents, from a corrosion-resistant metal alloy which is also chemically resistant to the contents.

The invention is explained in detail in the description of an example of embodiment which follows, in conjunction with the drawing, in which:

FIG. 5 shows a plan view of the container, viewed in the direction of the arrow 5 in FIG. 2;

FIG. 5a shows an enlarged illustration, on a larger scale, of the region 5a of the container bordered by dot-and-dashed lines in FIG. 5;

FIGS. 6, 7 and 8 show side views of the container corresponding to FIG. 2, but with various positions of the lid during the opening operation being illustrated;

FIGS. 6a, 7a and 8a show the respective region of the container bordered by dot-and-dashed lines in FIGS. 6, 7 and 8, on an enlarged scale;

FIG. 9 shows a sectional view of the lid and of the upper end of the container body of the container according to the invention with the lid seal not tensioned;

FIG. 9a shows an enlarged detail of the part of the lid lying, in FIG. 9, within the region 9a bordered by dot-and-dashed lines and of the upper edge region of the container body;

FIG. 9b shows a sectional view corresponding to FIG. 9a, in which the lid seal is shown in the tensioned position, sealingly closing the container body;

FIG. 9c shows a sectional view of the lid corresponding to FIGS. 9a and 9b, in which, because of the interior pressure prevailing in the container, the safety devices preventing the opening of the container are active;

Figure 10A:
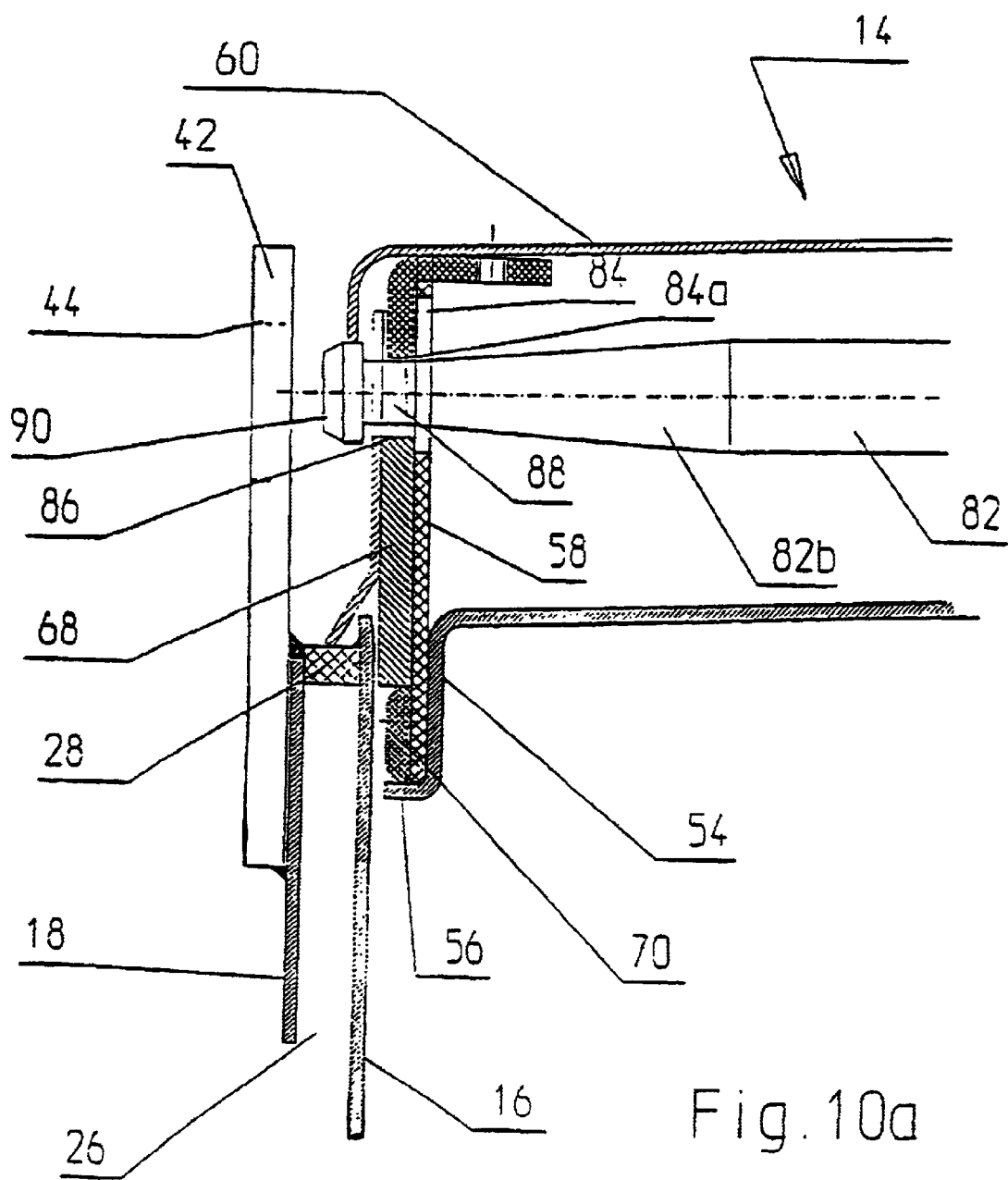
Figure 10B:
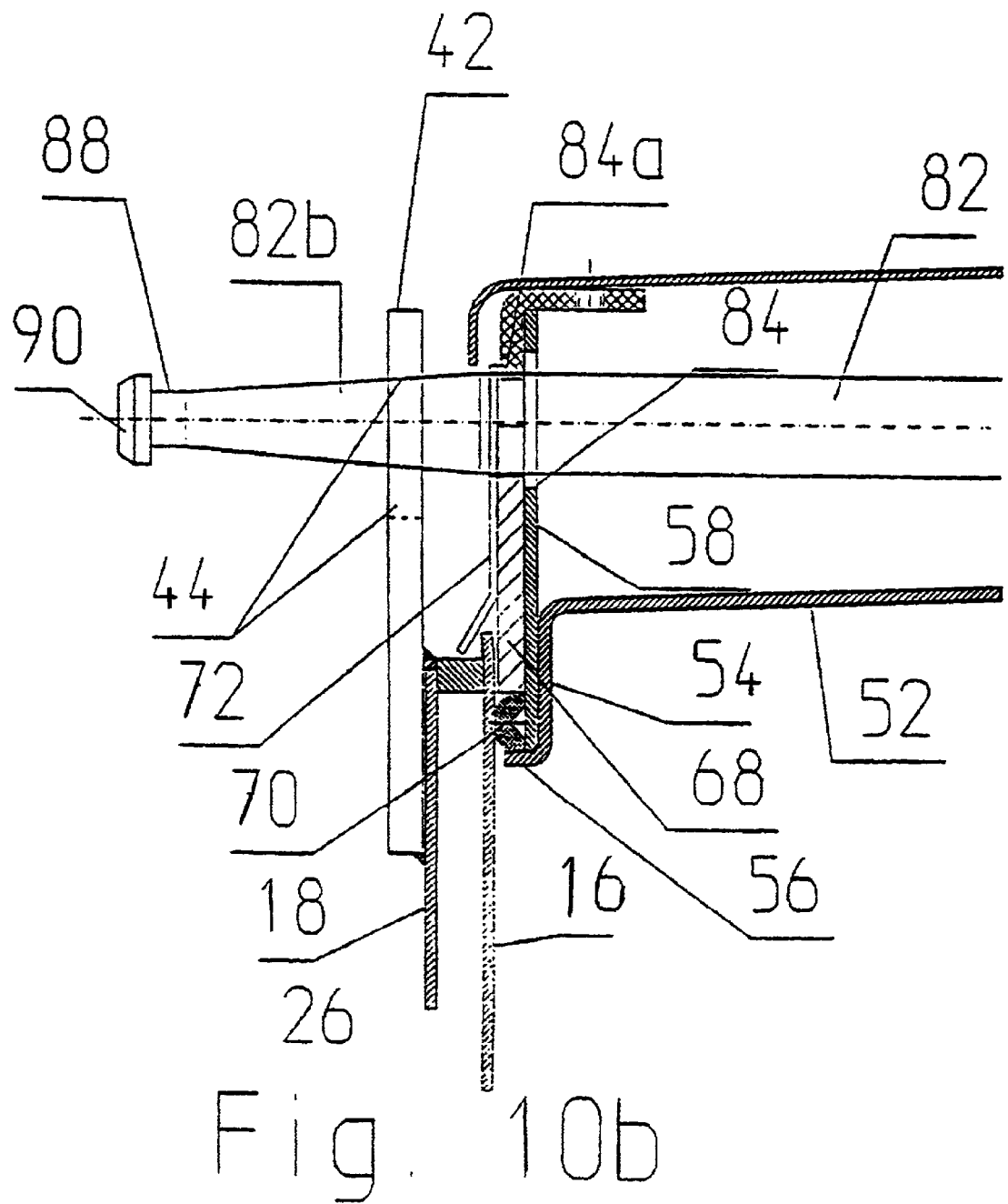
Figure 11A:
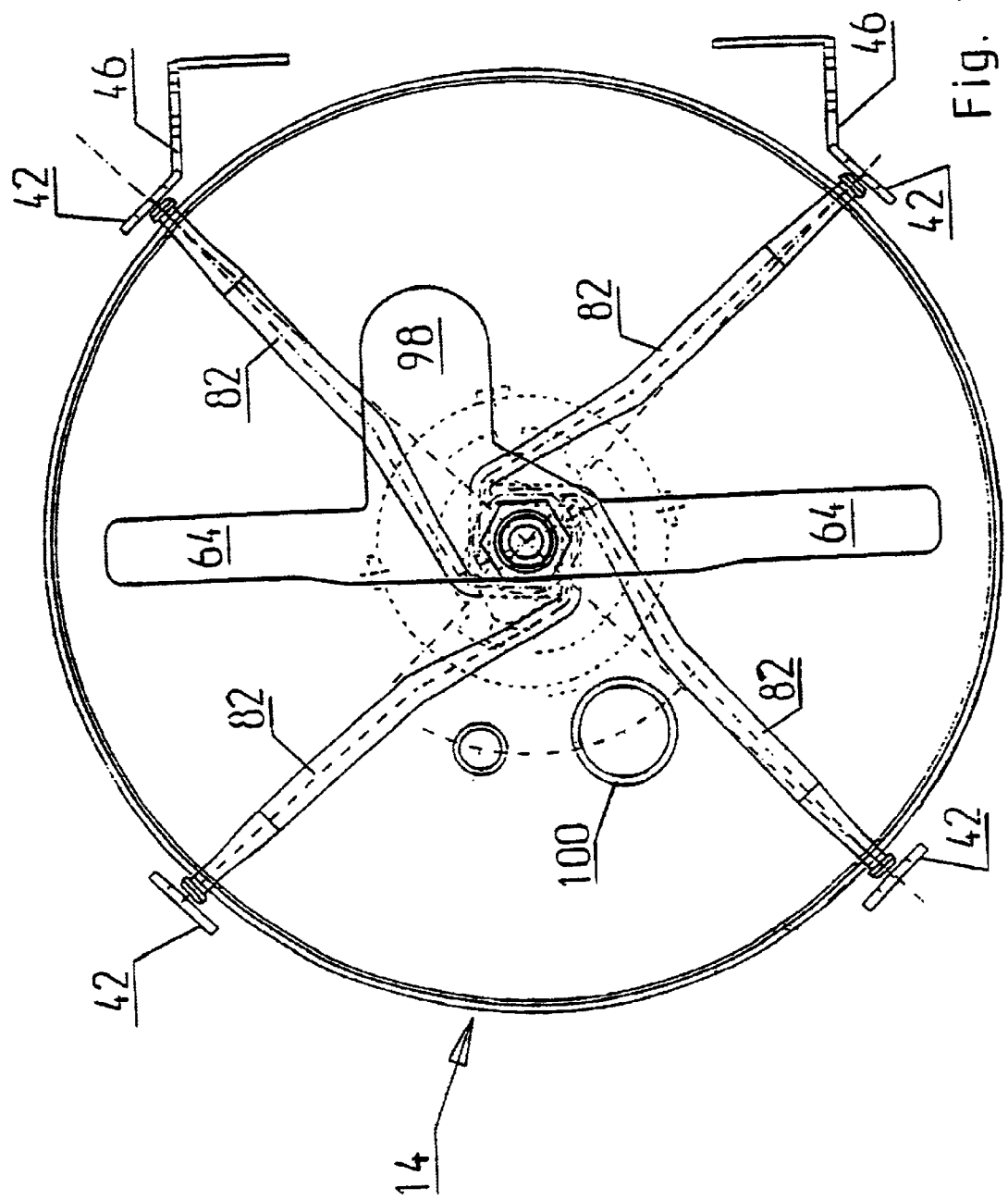
Figure 11C:
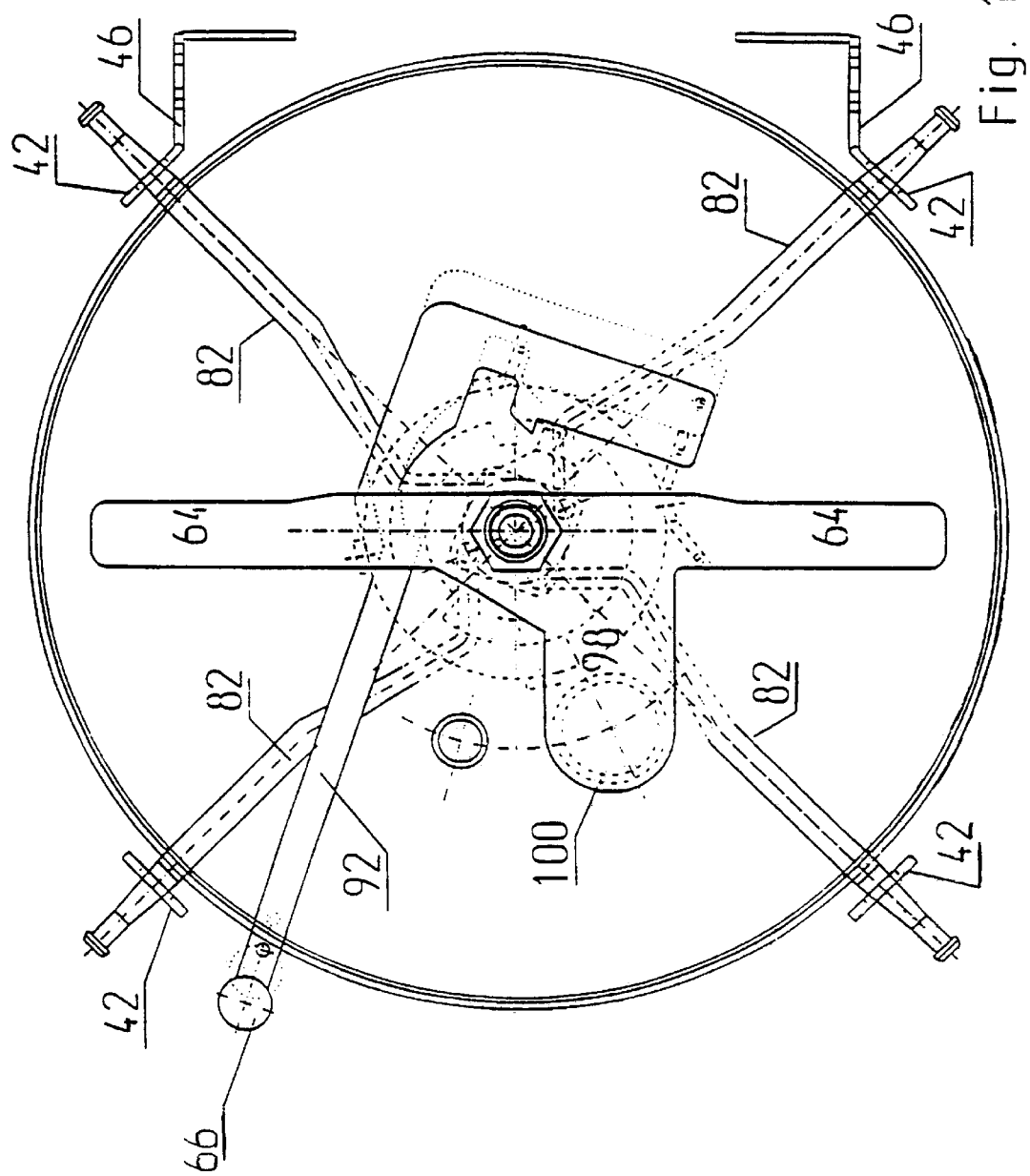
Figure 12C:
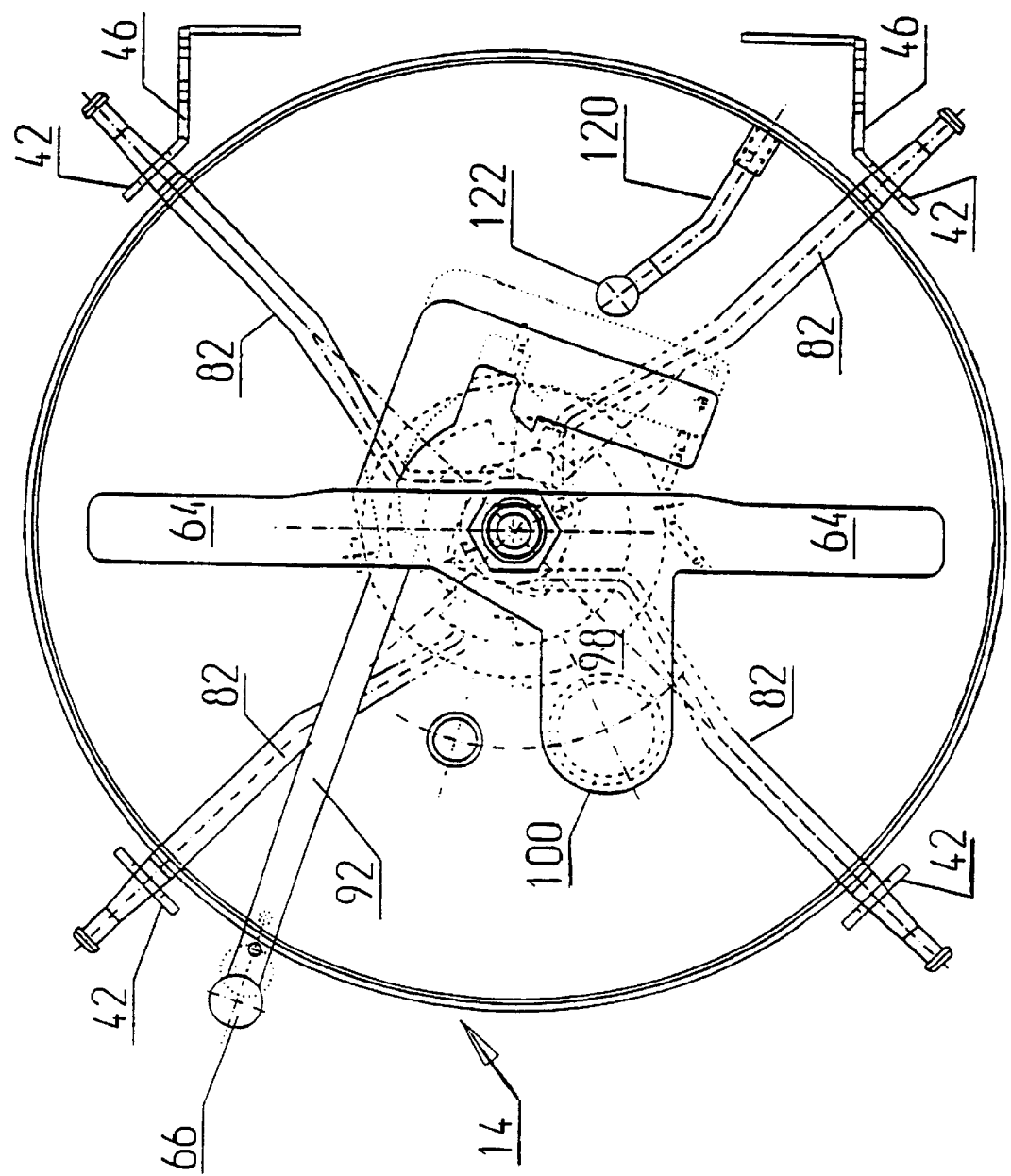

FIGS. 10a, 10b each show enlarged partial views of the region of the lid bordered by dot-and-dashed lines in FIGS. 9a and 9b, respectively, and of the upper edge region of the container body;

FIGS. 11a, 11b and 11c each show a plan view of the lid of the container according to the invention with the lid outer wall removed, these views illustrating different locking positions of the locking and tensioning members of the lid seal;

FIG. 12a shows a plan view of the lid, corresponding to FIG. 11b, with an additionally illustrated spraying member for cleaning the interior of the lid with a cleaning fluid fed in under pressure;

FIG. 12b shows a sectional view through the half of the lid located on the right in FIG. 12a, the spraying member being shown; and FIG. 12c shows a plan view of the lid without outer lining and handle in the closed state of a locking element preventing the opening of the lid.

The inventive container shown in FIGS. 1 to 3 and 5, designated as a whole by 10, comprises as its basic components the container body 12 (FIG. 4) and a lid 14 pivotably articulated on the container body.

The actual part of the container body intended to receive the contents is of double-walled configuration and is composed of a cylindrical inner container 16 and an outer container 18 surrounding the latter at a distance. The inner container is open at its top and is closed by a bottom wall 20 at the bottom. The outer container 18 is placed upon a flat base plate 22, which is square in this specific case, its vertical outer wall 24 being octagonally defined in plan view (FIG. 5), in a manner such that the outer wall regions lying between the corners and extending parallel to the base plate 22 make a smooth transition into the boundaries of the base plate. As a result, in the corner regions, a section of the base plate 22 which is triangular in plan view projects in each case beyond the outer wall 24 of the outer container. The outer wall 24 is welded to the base plate 22 at the lower end, and in the same way the cylindrical peripheral wall of the inner container 16 is welded to the bottom wall 20. It is apparent from FIG. 4 that the external diameter of the inner container is smaller than the clear internal measurement of the outer container, so that a peripheral intermediate space 26 therefore exists between the inner container 16 and the outer container 18. The intermediate space 26 is also provided at the bottom between the bottom wall 20 of the cylindrical inner container 16 and the base plate 22. At the top, this intermediate space is closed off by a shaped plate 28 welded in between the outside of the inner container 16 and the inside of the outer container 18 and thus fixing the inner container 16 in the outer container 18 with a concentric orientation. At the bottom, spacers (not shown) may be provided between the bottom wall and the base plate 22 and transmit the weight of the container contents acting upon the bottom wall 20 directly to the base plate 22.

Provided at a distance below the base plate 22 is a bottom frame 30, also square and having outer dimensions somewhat smaller than those of the base plate, which is retained by supports 32 welded in between the base plate and the bottom frame at a predetermined distance from the base plate 22, the said distance permitting the introduction of the horizontal arms of the forks of fork lifts or similar materials handling vehicles.

A metallic corner section 34 is provided in each of the corner regions of the base plate projecting beyond the outer surface of the outer container 18 and extending in the vertical direction to a point above the open upper end of the inner and outer containers, these corner sections 34 being provided in their upper end regions with apertures 36 into which the stop means of lifting members can engage. In addition, horizontal support plates 38 are welded in between the legs of the corner sections and allow the placement of the bottom plate 30 of an identical container 10 and hence the stacking of the containers 10 according to the invention one above the other. The corner sections 34 are also connected, at a distance below the upper edge of the outer and inner containers via corner plates 40 welded to the corner sections 34 on one side and the outer wall of the outer container 18 on the other.

Figure 1:
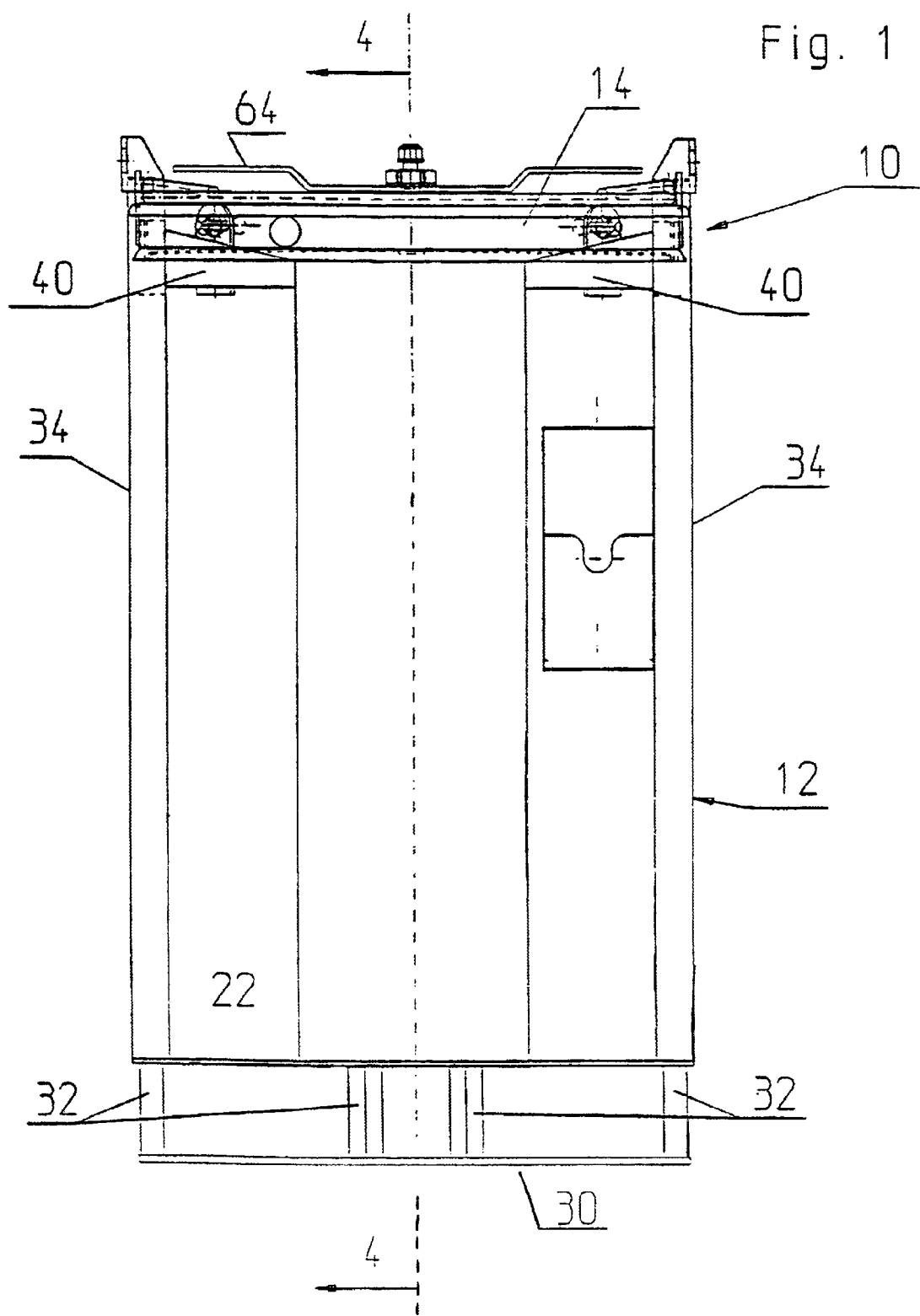
FIGS. 1 to 3 show a front view, a side view and a rear view of the container according to the invention.
Figure 2:
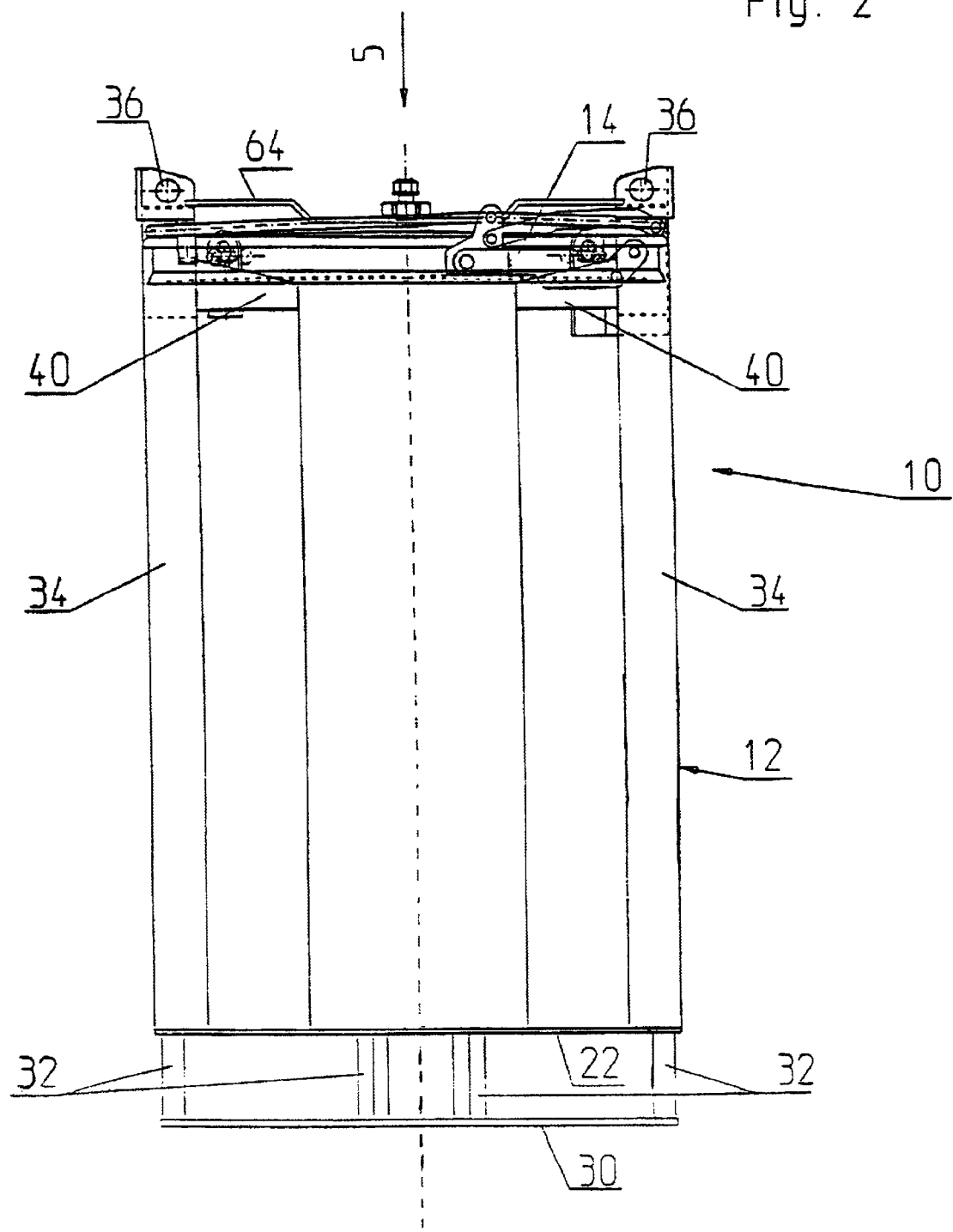
Figure 3:
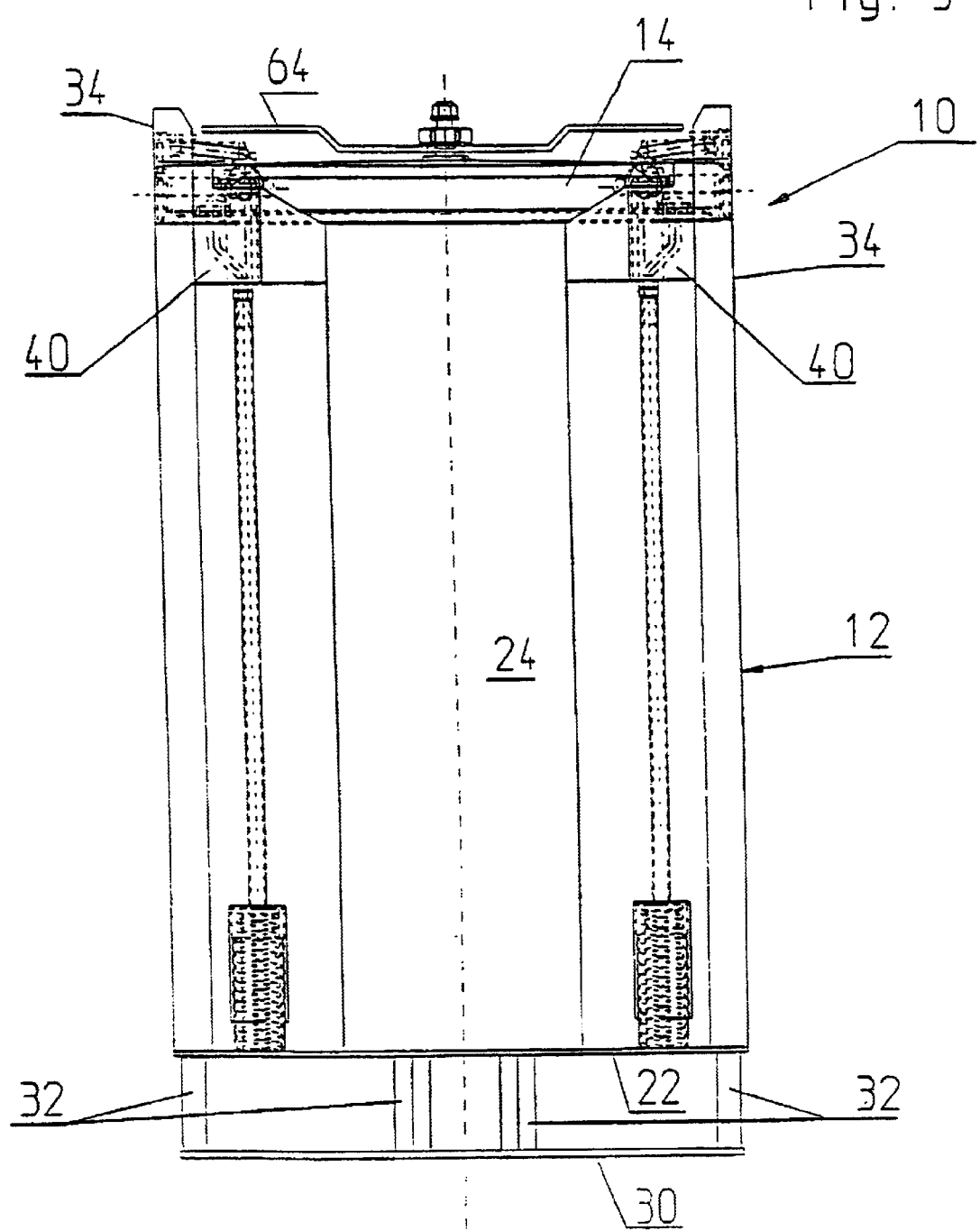
Figure 4:
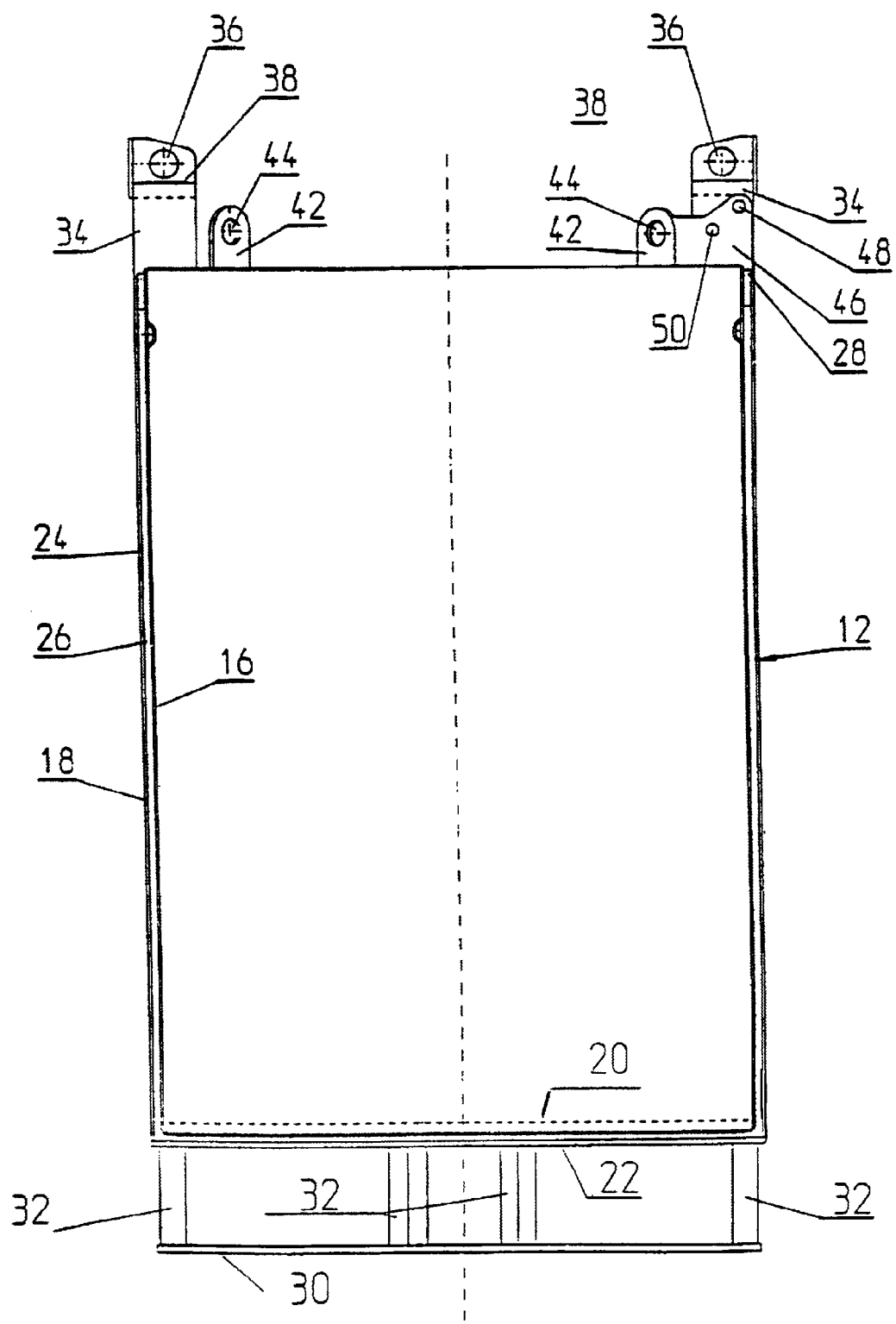
FIG. 4 shows a sectional view through the container body without a lid, in the plane of section illustrated in FIG. 1 by the arrows 4—4.

In the regions of the outer wall of the outer container lying above the projecting corner regions of the base plate 22, moreover, a tab 42 projecting upwards beyond the upper edge of the outer container is in each case welded on, these comprising at their free upper ends an aperture 44 which in the specific case is of circular outline and—as will be described further below—serves as a locking seating. The tabs 42 provided at the right-hand side of the illustration in FIGS. 4 and 5 are enlarged to form a bearing plate 46 with two mutually spaced bearing holes 48, 50, which serve for the pivotable mounting of articulated levers, described below, of a joint mechanism pivotally mounting the lid 14 on the container body 12.

FIGS. 5 and 9 show the basic structure of the lid 14 of the container according to the invention. The lid comprises, first, the actual lid wall 52, sealing off the interior of the container in the closed position and making a transition, in its edge region, into an annular wall region 54 tilted at right angles into the interior of the container, at the free end of which wall region 54, in turn, a radially outward-tilted peripheral flange 56 is formed, whose external diameter is slightly smaller than the clear internal diameter of the inner container 16. Fixed on the annular wall region 54 is a cylindrical surrounding peripheral wall 58, projecting beyond the lid wall 52 in the upward direction, supported by its lower end on the flange 56 and welded to the lid wall 52. The upper free edge of the peripheral wall then also bears an outer lid wall 60 of sheet metal, which projects radially beyond the peripheral wall 58 and is bent over downwards in the outer edge region. In the intermediate space between the inner lid wall 52 and the outer lid wall 60 are further disposed the actuating and locking members of a tensioning and locking device, further described below, which fixes the lid 14, in the closed position, in the inner container with hermetic sealing. The actuation of this tensioning and locking device is effected by means of a handle 64, rotatably mounted on a journal projecting upwards and centrally from the lid wall 52 and passing through a central aperture 62 in the outer lid wall 60, which handle 64 has the recognizable form of a two-armed lever in FIG. 5. In addition, the figure of the drawing shows the actuating end 66, guided out of the lid, of a locking element 92, which is shown in FIGS. 11c, 12a and 12b and whose function will be further described in connection with those figures.

A cylindrical tensioning ring 68 is mounted on the peripheral wall 58 of the lid 14 to be displaceable towards the central axis of the container. Between the edge of the tensioning ring 68 facing the interior of the container and the flange 56 of the inner lid wall 52 is disposed an elastically deformable peripheral annular seal 70, which is elastically deformed from the untensioned shape shown in FIG. 10a, in the event of a displacement of the tensioning ring 68 towards the interior of the container, into the form shown in FIG. 10b, during which process it is sealingly pressed against the inner wall of the inner container 16 and the outer wall of the peripheral wall 58. Also disposed on the outside of the tensioning ring 68 is a peripheral scraper ring 72 of thin sheet metal, which is conically widened in its lower edge region, facing the container, forms a drip edge with its free lower edge which, in the closed position, rests on the shaped plate 28 closing the intermediate space between the inner container 16 and the outer container 18, and prevents moisture accumulating on the lid 14—for example, as a result of atmospheric influences—from penetrating into the gap between container and lid.

The structure and function of the tensioning and locking device mounting the lid in the closed position with hermetic sealing is explained below with reference to FIGS. 9, 9a to 9c, 10a, 10b and 11a to 11c.

The handle 64 rotatably disposed above the outer lid wall 60 and configured as a two-armed lever is connected in a rotationally fixed manner to a bushing 74 passing through the central aperture 62 in the outer lid wall, which bushing 74 is disposed on a journal 76, mentioned earlier, projecting upwards from the top of the lower lid wall 52 and extending through the aperture 62 in the upper lid wall 60. The bushing 74 bears at its lower end, in a rotationally fixed manner, an actuating plate 78 which is square in the specific case and in each of whose four corner regions, projecting beyond the bushing 74, a hole 80 is provided, into which engages the respective inner, upward-tilted end 82a of elongate, shank-like locking elements 82 extending substantially radially outwards to the peripheral wall 58 and also passing radially outwards through the latter. The ends 82a are twistably mounted in the holes 80 and, in the event of rotation of the handle 64 via the bushing 74 and the actuating plate 78, are displaced, the downward-angled shape of the locking elements in the inner end region, identifiable in FIGS. 11a to 11c, making it possible for the locking elements, which are substantially radially guided to extend radially outwards, to be displaced, during actuation of the handle out of the closed position of the lid into the open position, out of the fully advanced locking position illustrated in FIG. 11c into the retracted open position illustrated in FIG. 11a, without their radially inward end sections impacting upon the bushing 74 or the journal 76. The radially outward ends of the locking elements 82 are passed through a guide hole 84 in the peripheral wall 58, the clear internal diameter of the guide hole 84 being larger than the maximum external diameter of the respectively assigned locking element. The locking element then further passes through a cut-out 86 in the tensioning ring 68 and in the drip ring 72, which likewise have a radius which is greater than the maximum radius of the locking element. In their radially outward end regions, the elongate locking elements 82 each have a tensioning section 82b, tapering conically outwards, which makes a transition at its end into an elongate locking element extension 88, at the free end of which a head 90 of enlarged diameter is provided.

In the unlocking position of the components of the tensioning and locking apparatus described above, the locking elements 82 are in the position illustrated in FIGS. 9, 9a, 10a and 11a, in which the locking elements are retracted so far into the interior of the lid that the heads 90 at the free ends of the extensions 88 project radially outside the tensioning ring 68 and the drip ring 72. In this condition, therefore, the extension 88 of the locking element passes through the cut-out 86 in the tensioning ring 68 and the guide hole 84.

Because of the small diameter of this extension 88, the tensioning ring 68 can adopt the raised position shown in FIGS. 9, 9a and 10a, supported on the top of the detensioned annular seal 70. If the actuating handle 64 is then turned in the locking direction and the locking elements 82 are displaced via the bushing 74, connected in a rotationally fixed manner, and the actuating plate 78, the tensioning section 82b, tapering conically outwards, enters the hole in the guide hole 84a and the cut-out 86 of the tensioning ring 68. The configuration varies such that the top of the conical tensioning section 82b rests on the guide hole and an abutment 84a fixed above the latter and its bottom rests on the bottom of the cut-out 86 in the tensioning ring 68, so that, as the locking elements are increasingly advanced, the tensioning ring is necessarily displaced in the downward direction and then compresses the annular seal 70 in the vertical direction, as depicted, as a result of which the latter is deformed radially outwards and inwards and comes into sealing contact on the inner wall of the inner container 16 and the outer wall of the peripheral wall 58 of the lid 14. The lid 14 is thus initially fixed by positive finting in the inner container 16 in the region of the annular seal 70. As the handle is turned further, into the locking position illustrated in FIGS. 9c, 10b and 11c, the locking elements 82 are pushed outwards so far that the conically tapered tensioning section 82b lies outside the cut-out 86 in the tensioning ring and still engages into the aperture 44 of the respectively assigned upward-projecting tab 42 provided on the container body. In this case, therefore, an additional, positive-fitting locking engagement of the radially outward ends of the locking elements 82 with the tabs 42 is formed, ensuring that when the lid is unlocked, even if the inner space of the inner container is under high pressure, a sudden bursting-open of the lid when the annular seal is detensioned and hence the loss of the positive-fitting mounting of the lid is reliably excluded. The reason is that the detensioning of the annular seal 70 takes place before the position of the locking elements in which the head 90 is retracted through the aperture 44 in the respective tab 42. FIGS. 11c, 12a and 12c show the elongate locking element 92, previously mentioned in connection with FIG. 9, which is tensioned into the locking position, shown in solid lines, with spring assistance, as a result of which a bolt provided at its inner end is pulled under a blocking disc 96 and in front of a blocking cam 94. Opening of the lid by forces undesirably exerted on the lever arms of the handle 64 is thereby excluded. Only when the actuating end is deliberately pushed into the interior of the lid against the spring prestress by the operator does the bolt come free of the locking cam 94, making it possible for the handle 64 to be turned. This release position is illustrated in the said figures of the drawing by a dotted illustration of the locking element 92. It is also possible to see that a hole is made in the end section of the locking element 92 located outside the lid in the locking position, so that, if a lock or a seal is attached, pushing of the locking element 92 into the lid and hence unlocking of the closure can be prevented.

A covering flap 98 also projects horizontally from the handle 64 and, in the closed position (FIG. 11c), covers a through bushing 100 provided in the lid and capable of being sealingly closed by a screw insert, which through bushing 100—for example, for the purpose of sampling or refilling—makes access to the interior of the container possible without opening of the lid 14.

FIG. 9c illustrates an automatic securing of the lid 14 against opening, which prevents opening of the lid under pressure. The pressure in the container acting on the bottom of the lid inner wall 52 is indicated by the upward-pointing arrows in the figure of the drawing. This pressure is transmitted via the tensioning ring 68 and the cut-out 86 to the rams 82. The lid can then lift sufficiently far for the rams to contact the top of the apertures 44 in the tabs 42. As a result of the forces then acting, the ends 82a of the rams move upwards in the vertical direction and press the actuating plate 78 and the bushing 74, and hence the cam 94 on the axle 76, sufficiently far upwards that the locking mechanism can no longer be actuated via the handle 64. The cam 94 is then held in the closed position in a cut-out of the blocking disc 96.

The pivotable articulation of the lid 14 on the container body 12 is effected—as mentioned earlier—by a joint mechanism, which in the specific case is configured as a four-joint mechanism. When the lid is open, this joint mechanism compels an opening movement which is illustrated in FIGS. 6 to 8. The opening characteristic of the lid is characterized in that it initially performs a predominantly vertical movement component at the start of its opening movement (FIG. 6), which thus raises the part of the lid 14 dipping into the inner container 16 above the inner container, whereupon the lid, during the further opening movement, pivots above the pivot position shown in FIG. 7 into the completely opened position (FIG. 8), in which it is additionally guided laterally adjacent to the container body 12, so that the inner container is accessible without restriction for filling from above or, alternatively, for the introduction of cleaning members of a cleaning installation.

The double joint mechanism provided on a side at right angles and opposite to the pivot axis of the lid is formed, on the container body side, in each case by the bearing plate 46 connected in each case to a tab 42 and already mentioned in connection with FIG. 4. In the bearing holes 48, 50, bearing bolts are provided on which the container body ends of articulated levers 102, 104 are pivotably mounted. The lid ends of the articulated levers 102, 104 are mounted on bolts 106, 108, which project from a bearing plate 110 provided on the lid 14. The lid movement characteristic previously mentioned in connection with FIGS. 6 to 8 is obtained by dimensioning the effective length of the articulated levers 102, 104 and by the arrangement of the bearing points of the articulated levers 102, 104 on the bearing plates 46, 110 illustrated in the figures of the drawing. FIGS. 6a to 8a show the respective positions of the articulated levers 102, 104 in the positions corresponding to the lid positions shown in FIGS. 6, 7 and 8, on a larger scale. It is also apparent here that a pressure rod 112 engages on the articulated lever 104 and is retained under compressive prestress by a spring arrangement 114 mounted on the assigned corner region of the base plate 22. As a result of the spring forces introduced by the spring arrangement 114 via the pressure rod 112 into the joint mechanism, the weight of the lid 14 is—partially— compensated, as a result of which the handling of the lid during opening and closing is greatly facilitated.

To fix the lid 14 in a preselected opening position, in the container according to the invention, a further bolt 116 (FIG. 5a) is resiliently mounted in the region of the joint mechanism shown at bottom right in FIG. 5, at one end of which bolt 116 an actuating button 118 is disposed. The bolt 116 latches, by means of a cut-out, in the completely open position of the lid 14, on an assigned seating of the pressure rod 112, in such a way that the lid 14 is secured against falling shut. By actuation of the button 118, the function of the articulated lever 104 is released, so that the lid 14 can then be closed.

FIGS. 12a and 12b illustrate a further possibility for cleaning the interior of the lid 14. For this purpose, a hole is provided in the peripheral wall 58 of the lid 14, from which a pipe 120 projects into the intermediate space between the lid walls 52, 60. A spray head 122 is provided at the end of the pipe 120. As a result of connection of the pipe 120 to an outer line (not shown) carrying a liquid cleaning medium under pressure, which connection can be effected, for example, via a self-closing quick-action coupling (likewise not shown), the inner space of the opened lid can be cleaned in the desired manner when necessary.

The container configured in a manner according to the invention has, in tests, proved particularly highly suitable, both as regards mechanical resistance to external stress and as regards security against the escape of contents after such stresses, for taking up or—in other words—thestorage and transportation and also handling of liquid and pourable solid hazardous goods. Because of its simple handling, which provides security against operational errors, the container is suitable for virtually universal use and, as such, is particularly helpful for logistical purposes when used in the hazardous goods sector.

What is claimed is:

1. Container for liquid and/or solid substances, comprising a container body which is of double-walled form in its base and its circumferential region as a result of an inner container inserted into an outer-container and continuously cylindrical from the base to a filling aperture, and has at its top the filling aperture which is of circular outline in plan view and can be hermetically sealed by a pivotable lid with an annular seal, which lid, in a part-region of the lid on a container side in a closed state, is of circular form such that it can be pivoted to fit into the inner container and is provided with locking means which are optionally actuable from a position retracted from locking seatings provided on the container body into a position engaging with positive fitting into the locking seatings, the annular seal being disposed in the part-region of the lid lying within the filling aperture in the closed position of the lid and being formed as a continuous sealing ring of elastomeric material, whose external diameter in an undeformed state is substantially equal to or only slightly smaller than a clear internal diameter of the inner container and whose internal diameter substantially equal to or only slightly larger than an external diameter of the lid in a region retaining the annular seal in its intended assembly position on the lid, wherein the lid, in its end region facing the interior of the container, comprises a peripheral, radially projecting flange which is adjoined, in the direction away from the interior of the container, by a cylindrical peripheral wall on which first the annular seal and then a continuous cylindrical tensioning ring are disposed to be displaceable in a longitudinal direction of the container, and wherein the tensioning ring projects beyond an end wall (52) of the lid (14) on the interior of the container, in a direction away from the interior of the container, and an adjustment means for the optional displacement of the tensioning ring in the direction leading towards the interior of the container or out of the interior of the container engage onto a region of the tensioning ring projecting beyond the lid end wall, wherein the adjustment means comprises locking elements distributed in the peripheral direction on a top, remote from the container, of the lid end wall beyond the periphery thereof, and guided in a substantially radially displaceable manner and capable of being advanced into and retracted from respectively assigned apertures in the tensioning ring, which locking elements each engage into the respectively assigned aperture in the tensioning ring by a limiting surface which in each case tapers from inside to outside.

2. The container according to claim 1, wherein the outer container has a shape which is polygonal, in plan view, and wherein the cylindrical inner container is disposed in concentric orientation to the outer container and its external diameter is at least slightly smaller than a clear distance measured between the interior surfaces of the outer container.

3. The container according to claim 2, wherein the outer container comprises a substantially square base plate, whose diametrically opposite limiting edges are oriented substantially flush with the outside of the assigned opposite part-surfaces of the outer container.

4. The container according to claim 3, wherein, in the corner regions of the base plate projecting beyond the outer surface of the outer container, a metallic corner section extending to beyond the filling aperture in the vertical direction is in each case provided.

5. The container according to claim 2, wherein the shape is octagonal.

6. The container according to claim 3, wherein a total of four locking elements, each offset relative to one another by approximately 90° in the peripheral direction, are provided on the top of the lid end wall and in that tabs provided with apertures serving as locking seatings are each disposed to project in the vertical direction from an upper edge of the container body above the projecting corner regions of the base plate.

7. The container according to claim 1, wherein the locking elements are extended radially outwards via the tapering limiting surface engaging into the respective aperture in the tensioning ring and in that tabs with apertures as locking seatings for the locking element extensions are provided substantially flush with the apertures in the tensioning ring of the container body.

8. The container according to claim 7, wherein a head, enlarged in diameter by comparison with the locking extension, is provided in each case on the free outer end of the locking extensions, the diameter of which head is in each case smaller than the diameter of the assigned aperture, provided as a locking seating, in the tabs.

9. The container according to claim 8, wherein the head provided at the free end of each locking element extension comprises a limiting surface tapering radially and frusto-conically outwards.

10. The container according to claim 1, wherein the locking elements are each connected via an elongate shank to an assigned lever arm rotatable about the central axis of the container.

11. The container according to claim 10, wherein the lever arms for the actuation of the locking elements are disposed on a common actuating element rotatable about the central axis of the container, on whose upper end, projecting from the lid, a manually actuable lever-like handle is provided.

12. The container according to claim 11, wherein the dimensions and the position of the outward-tapering limiting surfaces provided on the locking elements and engaging into assigned apertures in the tensioning ring and the locking element extensions, and also the effective length of the lever arms rotatable about the central axis of the container are so matched to one another that, in the event of a rotational actuation of the handle out of the closed position of the lid over a first partial actuation path, the tensioning ring is released in the vertical direction to such an extent that the annular seal, which in the closed position of the lid is deformed by the tensioning ring into sealing contact on the inner container, is deformed back elastically into its initial shape, the locking element extensions still engaging through the apertures serving as locking seatings, in the tabs and are only retracted out of the apertures in the tabs on further rotational actuation over a residual actuation path.

13. The container according to claim 12, wherein a stop device which is active between the lever-like handle and the lid and can be manually inactivated is provided, and, on actuation of the lever-like handle out of the closed position, becomes active after one rotation over the first partial actuation path.

14. The container according to claim 13, wherein the stop device comprising a stop assigned to the lever-like handle and projecting towards the top of the lid, on the one hand, and a counter-stop projecting upwards from the lid and disposed in the actuation path of the stop on the other hand, and in that the stop assigned to the lever-like handle is configured to be manually moveable out of its stop position in which it comes to rest against the counter-stop.

15. The container according to claim 14, wherein the stop is resiliently pretensioned in the stop position against the counter-stop and can be adjusted out of the stop position by an unlocking element assigned to the lever-like handle, against the spring prestress.

16. The container according to claim 11, wherein the common actuating element is an actuating plate.

17. The container according to claim 1, wherein the lid is pivotably articulated on an upper edge of the container body.

18. The container according to claim 17, wherein the lid is articulated on the container body to be pivoted through more than 90°.

19. The container according to claim 18, comprising a manually actuatable lid securing device which allows the lid to be fixed in an intermediate position.

20. The container according to claim 19, wherein the joint mechanism is arranged so that that the lid, pivoted into the intermediate position and fixed, is laterally offset relative to the container body in plan view.

21. The container according to claim 17, wherein the lid is articulated on the container body via a joint mechanism which guides the lid, during the start of an opening movement, with a movement component oriented substantially out from the inner container and only makes a transition to a pivot movement after the lid has emerged from a mouth of the inner container.

22. The container according to claim 21, wherein the joint mechanism is configured as a four-joint mechanism.

23. The container according to claim 21, wherein a spring prestress device engages the joint mechanism and, at least during a first part of the opening movement of the lid out of its closed position, generates a force oriented in an opening direction which at least partially compensates for the weight of the lid acting in a closing direction.

24. The container according to claim 1, wherein at least parts of the container coming into contact with the container contents are produced from a corrosion-resistant metal alloy which is also chemically resistant to the contents.

* * * * *